United States Patent
Kassar et al.

(10) Patent No.: US 12,304,481 B2
(45) Date of Patent: *May 20, 2025

(54) SYSTEMS AND METHODS FOR CONTROLLING LONGITUDINAL ACCELERATION BASED ON LATERAL OBJECTS

(71) Applicant: FORD GLOBAL TECHNOLOGIES, LLC, Dearborn, MI (US)

(72) Inventors: Alice Kassar, Detroit, MI (US); Ramadev Burigsay Hukkeri, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 371 days.

This patent is subject to a terminal disclaimer.

(21) Appl. No.: 17/808,414

(22) Filed: Jun. 23, 2022

(65) Prior Publication Data
US 2023/0415739 A1   Dec. 28, 2023

(51) Int. Cl.
*B60W 10/00*   (2006.01)
*B60W 30/14*   (2006.01)
*B60W 50/00*   (2006.01)

(52) U.S. Cl.
CPC .......... *B60W 30/146* (2013.01); *B60W 50/00* (2013.01); *B60W 2050/0026* (2013.01);
(Continued)

(58) Field of Classification Search
CPC ......... B60W 60/00186; B60W 50/082; B60W 50/12; B60W 2420/408; B60W 2510/18;
(Continued)

(56) References Cited

U.S. PATENT DOCUMENTS

2021/0197858 A1*   7/2021   Zhang .................... G08G 1/161
2022/0119039 A1*   4/2022   Fujii ................... B62D 15/0255
(Continued)

OTHER PUBLICATIONS

Davis, L.C., Nonlinear dynamics of autonomous vehicles with llimits on acceleration, abstract.
(Continued)

*Primary Examiner* — Shardul D Patel
(74) *Attorney, Agent, or Firm* — Frank A. MacKenzie; Brooks Kushman P.C.

(57) ABSTRACT

Disclosed herein are systems, methods, and computer program products for controlling acceleration of a vehicle. The methods comprising: detecting, by a computing device, a lateral distance from a point on a trajectory of the vehicle to a first object the vehicle is expected to pass when following the trajectory, the first object being located off of and to a side of the trajectory and the point representing a future location of the vehicle while passing the first object; selecting, by the computing device, whether acceleration limiting is to be performed by the vehicle based on the lateral distance; obtaining an amount by which the acceleration of the vehicle is to be limited, when a selection is made that acceleration limiting is to be performed by the vehicle; and causing, by the computing device, the vehicle to perform operations for autonomous driving with limiting of acceleration by the obtained amount.

20 Claims, 19 Drawing Sheets

(52) U.S. Cl.
CPC ... *B60W 2520/06* (2013.01); *B60W 2554/402* (2020.02); *B60W 2554/4041* (2020.02); *B60W 2554/4044* (2020.02); *B60W 2554/801* (2020.02); *B60W 2720/106* (2013.01)

(58) Field of Classification Search
CPC ..... B60W 2554/4049; B60W 60/0016; B60W 60/0017; B60W 2554/4041; B60W 2554/801; B60W 2720/103; B60W 2720/106; B60W 60/0027; B60W 10/04; B60W 10/18; B60W 10/20; B60W 2556/40; B60W 2556/45; B60W 10/00
USPC .......................................................... 701/93
See application file for complete search history.

(56) References Cited

U.S. PATENT DOCUMENTS

2023/0415736 A1\* 12/2023 Kassar .............. B60W 60/0015
2023/0415781 A1\* 12/2023 Kassar .............. B60W 60/0016

OTHER PUBLICATIONS

Sawant, N., Longitudinal vehicle speed controller for autonomous driving in urban stop-and-go traffic situations, Graduate School of The Ohio State University, 2010.
Reschka, A. et al., Safe, dynamic and comfortable longitudinal control for an autonomous vehicle.

\* cited by examiner

SYSTEMS AND METHODS FOR CONTROLLING LONGITUDINAL ACCELERATION BASED ON LATERAL OBJECTS

BACKGROUND

Modern day vehicles have at least one on-board computer and have internet/satellite connectivity. The software running on these on-board computers monitor and/or control operations of the vehicles. The vehicle also comprises monocular or stereo cameras and/or lidar detectors for detecting objects in proximity thereto. The cameras capture images of a scene. The lidar detectors generate lidar datasets that measure the distance from the vehicle to an object at a plurality of different times. These images and distance measurements can be used for detecting and tracking movements of the object, making predictions as to the object's trajectory, and planning paths of travel for the vehicle based on the predicted objects trajectory.

A travel plan for a vehicle may comprise a spatial plan (for example, a trajectory defined by x-coordinates, y-coordinates and yaw displacements) and a speed plan (for example, velocity value(s), longitudinal acceleration parameter value(s) and/or deceleration parameter value(s)). The acceleration of the vehicle may be limited in accordance with an adaptive control feature which is governed by control parameters that provide limits on acceleration. The acceleration can be limited based on a pre-defined maximum value or a value determined based on road conditions. These acceleration limiting approaches can cause the vehicle to accelerate uncomfortably when passing moving objects that are nearby.

This document describes methods and systems that are directed to addressing the problems described above, and/or other issues.

SUMMARY

The present disclosure concerns implementing systems and methods for controlling acceleration of a vehicle. The methods comprise: detecting, by a computing device, a lateral distance from a point on a trajectory of the vehicle to an object the vehicle is expected to pass when following the trajectory (the object being located off of and to a side of the trajectory and the point representing a future location of the vehicle while passing the object); comparing, by the computing device, the lateral distance to a threshold value; selecting, by the computing device, whether acceleration limiting is to be performed by the vehicle based on whether the lateral distance is less than the threshold value; and causing, by the computing device, the vehicle to perform operations for autonomous driving with or without acceleration limiting based on the selecting.

Additionally or alternatively, the methods may comprise: detecting, by a computing device, a lateral distance from a point on a trajectory of the vehicle to a first object the vehicle is expected to pass when following the trajectory (where the first object is located off of and to a side of the trajectory and the point representing a future location of the vehicle while passing the first object); selecting, by the computing device, whether acceleration limiting is to be performed by the vehicle based on the lateral distance; obtaining an amount by which the acceleration of the vehicle is to be limited, when a selection is made that acceleration limiting is to be performed by the vehicle; and causing, by the computing device, the vehicle to perform operations for autonomous driving with limiting of acceleration by the obtained amount.

Additionally or alternatively, the methods may comprise: comprise performing the following operations by computing device(s): detecting a lateral distance from a point on a trajectory of the vehicle to a first object the vehicle is expected to pass when following the trajectory; selecting whether acceleration limiting is to be performed by the vehicle based on the lateral distance; obtaining a margin of the vehicle defined by a sequence of points; obtaining an amount by which the acceleration of the vehicle is to be limited based on the trajectory and the margin of the vehicle, when a selection is made that acceleration limiting is to be performed by the vehicle; and causing the vehicle to perform operations for autonomous driving with limiting of acceleration by the obtained amount.

The implementing systems can comprise: a processor; and a non-transitory computer-readable storage medium comprising programming instructions that are configured to cause the processor to implement a method for operating an automated system. The above-described methods can also be implemented by a computer program product comprising memory and programming instructions that are configured to cause a processor to perform operations.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Figure 1:
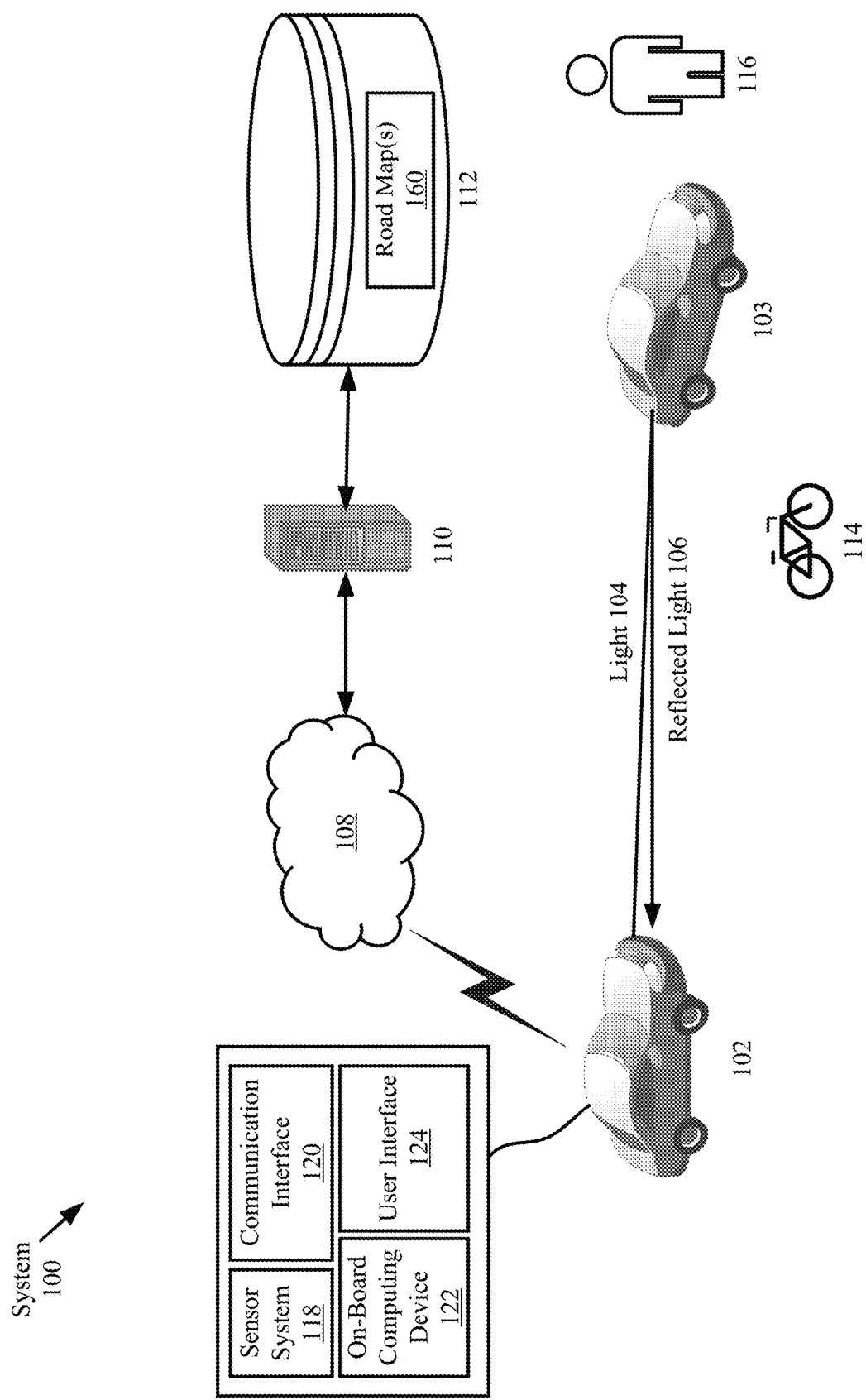
FIG. 1 is an illustration of an illustrative system.

As noted above, the acceleration of a vehicle may be limited during operation thereof. A desired longitudinal acceleration of the vehicle may only be limited by moving objects that the vehicle is acting on longitudinally. No information about lateral objects is used when deciding how to limit the acceleration of the vehicle. This can cause the vehicle to accelerate uncomfortably when passing moving objects that are nearby. The purpose of the present solution is to provide a method which incorporates lateral object information in order to limit the longitudinal acceleration of the vehicle. Doing so results in an improved ride quality when passing close by objects.

The present solution generally concerns implementing systems and methods for limiting acceleration of a vehicle when passing nearby movers to enhance ride quality. The methods involve obtaining sensor data and processing the sensor data to detect a lateral distance to an object that the vehicle is passing or is expected to pass when following the trajectory. For example, a vehicle has a trajectory which passes objects. The trajectory comprises a plurality of index points that are interconnected. Each index point represents a future location of the vehicle following the trajectory. The computing device detects the lateral distance for each object by, for example: selecting or identifying an index point of the vehicle trajectory that is aligned with a center or center axis of the object; determining a distance between the index point and a closest edge of the object; and considering the distance as the lateral distance for the object. The present solution is not limited to the particulars of this example.

Next, the system compares the lateral distance to a threshold value and selects whether acceleration limiting is to be performed by the vehicle based on results of this comparison. If the lateral distance is greater than or equal to the threshold value, then the vehicle may travel without any acceleration limiting. If the lateral distance is less than the threshold value, then the vehicle may travel with acceleration limiting.

In some scenarios, additional or alternative operations are performed to select whether acceleration limiting should be performed by the vehicle. For example, the system may analyze the sensor data to: detect whether the object is stationary or moving; (if the object is stationary) detect whether the stationary object is at least partially located outside of a drivable area for the vehicle (for example, a pedestrian sidewalk can be a non-drivable area outside of a drivable area such as a lane of a road) and at least partially located in a lane in which the vehicle is traveling; detect whether the stationary or moving object is inside the drivable area of the vehicle but located at or proximate to an edge of the drivable area; and/or (if the object is moving) detect whether the moving object is at least partially biased in the lane in which the vehicle is traveling. The object may be proximate to the edge of the drivable area when it is within a given distance therefrom (for example, 0-M meters, where M is an integer equal to or greater than one).

Once the detection(s) is(are) made, the system may perform operations to limit the amount of longitudinal acceleration that can be performed by the vehicle. The acceleration limiting may occur when: the lateral distance is less than the threshold distance; (if the object is stationary) the stationary object is at least partially located outside of the drivable area of the vehicle and at least partially located in the lane in which the vehicle is traveling; the stationary or moving object is located inside the drivable area but located at or proximate to an edge of the drivable area abutting the lane in which the vehicle; and/or (if the object is moving) the moving object is at least partially biased in the lane in which the vehicle is traveling.

As used in this document, the singular forms "a," "an," and "the" include plural references unless the context clearly dictates otherwise. Unless defined otherwise, all technical and scientific terms used herein have the same meanings as commonly understood by one of ordinary skills in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, semi-autonomous vehicles, manually operated vehicles, teleoperated vehicles, watercraft, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Notably, the present solution is being described herein in the context of autonomous vehicles. However, the present solution is not limited to autonomous vehicle applications. The present solution can be used in other applications such as robotic application (for example to control movements of articulating arms) and/or system performance applications.

FIG. 1 illustrates an example system 100, in accordance with aspects of the disclosure. System 100 comprises a vehicle 102 which is caused to travel along a road in a semi-autonomous or autonomous manner. Vehicle 102 is also referred to herein as an AV 102. The AV 102 can include, but is not limited to, land vehicles (as shown in FIG. 1), aircraft, watercraft, subterrenes, spacecraft, drones and/or an articulating arm (for example, with a gripper at a free end). As noted above, except where specifically noted this disclosure is not necessarily limited to AV embodiments, and it may include non-autonomous vehicles in some embodiments.

AV 102 is generally configured to detect objects 103, 114, 116 in proximity thereto. The objects can include, but are not limited to, a vehicle 103, a cyclist 114 (such as a rider of a bicycle, electric scooter, motorcycle, or the like) and/or a pedestrian 116.

As illustrated in FIG. 1, the AV 102 may include a sensor system 118, an on-board computing device 122, a communications interface 120, and a user interface 124. AV 102 may further include certain components (as illustrated, for example, in FIG. 2) included in vehicles, which may be controlled by the on-board computing device 122 using a variety of communication signals and/or commands, such as, for example, acceleration signals or commands, deceleration signals or commands, steering signals or commands, braking signals or commands, etc.

Figure 2:
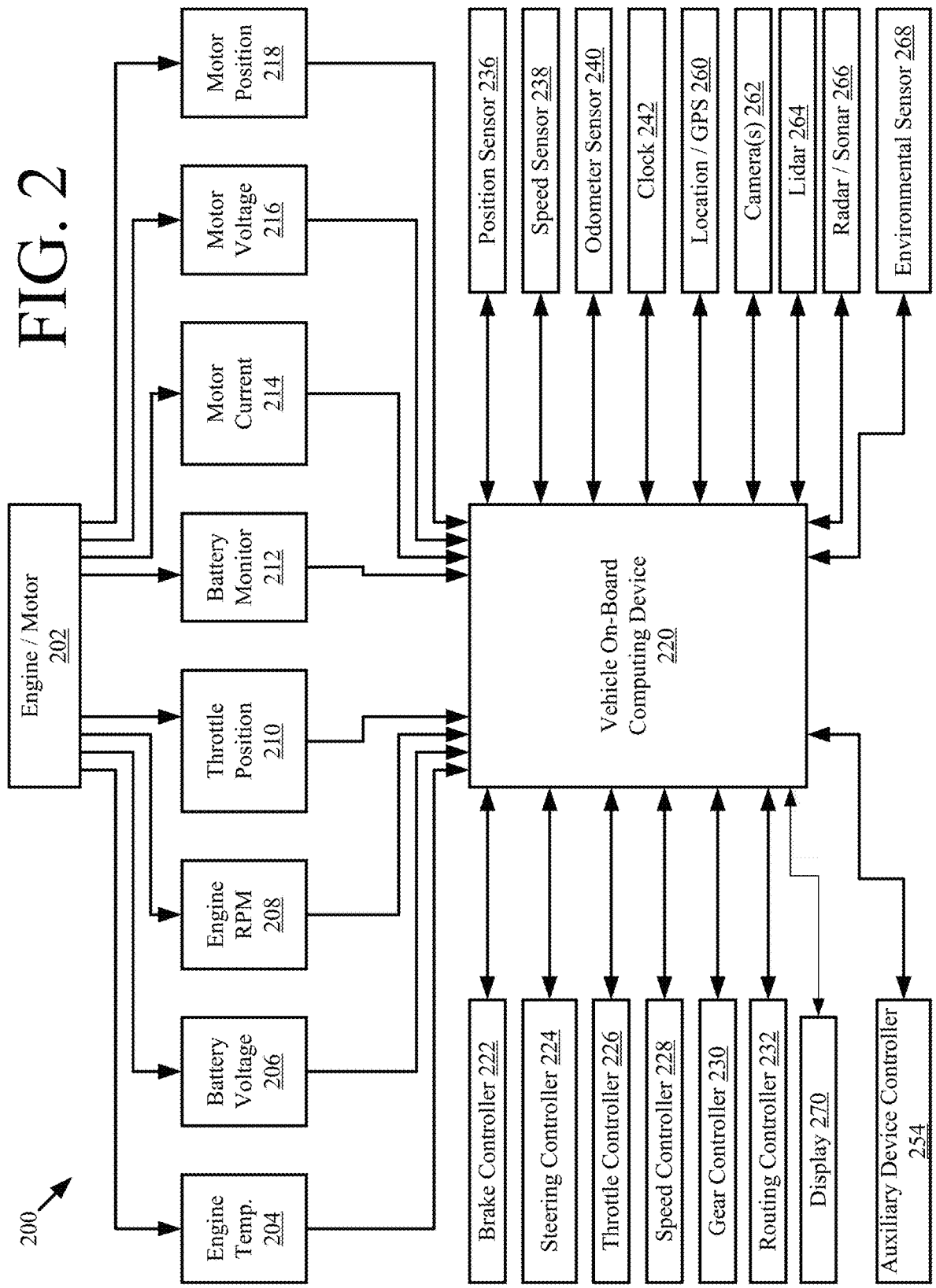
FIG. 2 is an illustration of an illustrative architecture for a vehicle.

The sensor system 118 may include one or more sensors that are coupled to and/or are included within the AV 102, as illustrated in FIG. 2. For example, such sensors may include, without limitation, a lidar system, a RADAR system, a laser detection and ranging (LADAR) system, a sound navigation and ranging (SONAR) system, camera(s) (for example, visible spectrum camera(s), infrared camera(s), etc.), temperature sensors, position sensors (for example, a global positioning system (GPS), etc.), location sensors, fuel sensors, motion sensors (for example, an inertial measurement unit (IMU), etc.), humidity sensors, occupancy sensors, and/or the like. The sensors are generally configured to generate sensor data. The sensor data can include information that describes the location of objects within the surrounding environment of the AV 102, information about the environment itself, information about the motion of the AV 102, information about a route of the vehicle, and/or the like. As AV 102 travels over a surface (for example, a road), at least some of the sensors may collect data pertaining to the surface.

As will be described in greater detail, AV 102 may be configured with a lidar system (for example, lidar system 264 of FIG. 2). The lidar system may be configured to transmit a light pulse 104 to detect objects located within a distance or range of distances of AV 102. Light pulse 104 may be incident on one or more objects (for example, AV 103) and be reflected back to the lidar system. Reflected light pulse 106 incident on the lidar system may be processed to determine a distance of that object to AV 102. The reflected light pulse 106 may be detected using, in some scenarios, a photodetector or array of photodetectors positioned and configured to receive the light reflected back into the lidar system. Lidar information, such as detected object data, is communicated from the lidar system to the on-board computing device 122. The AV 102 may also communicate lidar data to a remote computing device 110 (for example, a cloud processing system) over a network 108. Computing device 110 may be configured with one or more servers to process one or more processes of the technology described herein. Computing device 110 may also be configured to communicate data/instructions to/from AV 102 over network 108, to/from server(s) and/or database(s) 112.

It should be noted that the lidar systems for collecting data pertaining to the surface may be included in systems other than the AV 102 such as, without limitation, other vehicles (autonomous or driven), robots, satellites, etc.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from the database 112. Database 112 may be configured to store and supply raw data, indexed data, structured data, map data, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, etc. The user interface 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 120 over communication links such as those known as vehicle-to-vehicle, vehicle-to-object or other V2X communication links. The term "V2X" refers to a communication between a vehicle and any object that the vehicle may encounter or affect in its environment.

As noted above, the AV 102 may detect objects 103, 114, 116 in proximity thereto. Such object detections are facilitated using the sensor data generated by the sensor system 118 (for example, lidar datasets generated by an onboard lidar detector). The sensor data is processed by the onboard computing device 122 of the AV 102 and/or by the remote computing device 110 to obtain one or more predicted trajectories for the object given the sensor data. The predicted trajectories for the object may then be used to generate a trajectory for the AV 102. The AV 103 may then be caused by the on-board computing device to follow the trajectory.

FIG. 2 illustrates a system architecture 200 for a vehicle, in accordance with aspects of the disclosure. Vehicles 102 and/or 103 of FIG. 1 can have the same or similar system architecture as that shown in FIG. 2. Thus, the following discussion of system architecture 200 is sufficient for understanding vehicle(s) 102, 103 of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, the system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Revolutions Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors 218 such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device 220, it may be a separate device, or multiple clocks may be available.

The vehicle also will include various sensors that operate to gather information about the environment in which the vehicle is traveling. These sensors may include, for example: a location sensor 260 (for example, a GPS device); object detection sensors such as one or more cameras 262; a lidar sensor system 264; and/or a RADAR and/or SONAR system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The vehicle on-board computing device 220 may be implemented using the computer system of FIG. 4. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors to the vehicle on-board computing device 220. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the vehicle on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle. The manner in which the object detections are made by the vehicle on-board computing device 220 includes such capabilities detailed in this disclosure.

In addition, the system architecture 200 may include an onboard display device 270 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 220 may include and/or may be in communication with a routing controller 232 that generates a navigation route from a start position to a destination position for an autonomous vehicle. The routing controller 232 may access a map data store to identify possible routes and road segments that a vehicle can travel on to get from the start position to the destination position. The routing controller 232 may score the possible routes and identify a preferred route to reach the destination. For example, the routing controller 232 may generate a navigation route that minimizes Euclidean distance traveled or other cost function during the route, and may further access the traffic information and/or estimates that can affect an amount of time it will take to travel on a particular route. Depending on implementation, the routing controller 232 may generate one or more routes using various routing methods, such as Dijkstra's algorithm, Bellman-Ford algorithm, or other algorithms. The routing controller 232 may also use the traffic information to generate a navigation route that reflects expected conditions of the route (for example, current day of the week or current time of day, etc.), such that a route generated for travel during rush-hour may differ from a route generated for travel late at night. The routing controller 232 may also generate more than one navigation route to a destination and send more than one of these navigation routes to a user for selection by the user from among various possible routes.

In some scenarios, the vehicle on-board computing device 220 may determine perception information of the surrounding environment of the vehicle. Based on the sensor data provided by one or more sensors and location information that is obtained, the vehicle on-board computing device 220 may determine perception information of the surrounding environment of the vehicle. The perception information may represent what an ordinary driver would perceive in the surrounding environment of a vehicle. The perception data may include information relating to one or more objects in the environment of the vehicle. For example, the vehicle on-board computing device 220 may process sensor data (for example, lidar data, RADAR data, camera images, etc.) in order to identify objects and/or features in the environment of vehicle. The objects may include, but is not limited to, traffic signals, roadway boundaries, other vehicles, pedestrians, and/or obstacles. The vehicle on-board computing device 220 may use any now or hereafter known object recognition algorithms, video tracking algorithms, and computer vision algorithms (for example, track objects frame-to-frame iteratively over a number of time periods) to determine the perception.

In those or other scenarios, the vehicle on-board computing device 220 may also determine, for one or more identified objects in the environment, the current state of the object. The state information may include, without limitation, for each object: a current location; a current speed; an acceleration; a current heading; a current pose; a current shape, size and/or footprint; an object type or classification (for example, vehicle, pedestrian, bicycle, static object, or obstacle); and/or other state information.

The vehicle on-board computing device 220 may perform one or more prediction and/or forecasting operations. For example, the vehicle on-board computing device 220 may predict future locations, trajectories, and/or actions of one or more objects. For example, the vehicle on-board computing device 220 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, the vehicle on-board computing device 220 may also predict whether the vehicle may have to fully stop prior to entering the intersection.

In those or other scenarios, the vehicle on-board computing device 220 may determine a motion plan for the vehicle. For example, the vehicle on-board computing device 220 may determine a motion plan for the vehicle based on the perception data and/or the prediction data. Specifically, given predictions about the future locations of proximate objects and other perception data, the vehicle on-board computing device 220 can determine a motion plan for the vehicle that best navigates the vehicle relative to the objects at their future locations.

In those or other scenarios, the vehicle on-board computing device 220 may receive predictions and make a decision regarding how to handle objects and/or actors in the environment of the vehicle. For example, for a particular actor (for example, a vehicle with a given speed, direction, turning angle, etc.), the vehicle on-board computing device 220 decides whether to overtake, yield, stop, and/or pass based on, for example, traffic conditions, map data, state of the autonomous vehicle, etc. Furthermore, the vehicle on-board computing device 220 also plans a path for the vehicle to travel on a given route, as well as driving parameters (for example, distance, speed, and/or turning angle). That is, for a given object, the vehicle on-board computing device 220 decides what to do with the object and determines how to do it. For example, for a given object, the vehicle on-board computing device 220 may decide to pass the object and may determine whether to pass on the left side or right side of the object (including motion parameters such as speed). The vehicle on-board computing device 220 may also assess the risk of a collision between a detected object and the vehicle. If the risk exceeds an acceptable threshold, it may determine whether the collision can be avoided if the vehicle follows a defined vehicle trajectory and/or implements one or more dynamically generated emergency maneuvers in a time period (for example, N milliseconds). If the collision can be avoided, then the vehicle on-board computing device 220 may execute one or more control instructions to perform a cautious maneuver (for example, mildly slow down, accelerate, change lane, or swerve). In contrast, if the collision cannot be avoided, then the vehicle on-board computing device 220 may execute one or more control instructions for execution of an emergency maneuver (for example, brake and/or change direction of travel).

As discussed above, planning and control data regarding the movement of the vehicle is generated for execution. The vehicle on-board computing device 220 may, for example: control braking via a brake controller; direction via a steering controller; speed and acceleration via a throttle controller (in a gas-powered vehicle) or a motor speed controller (such as a current level controller in an electric vehicle); change gears via a differential gear controller (in vehicles with transmissions); and/or control other operations via other controllers.

Figure 3:
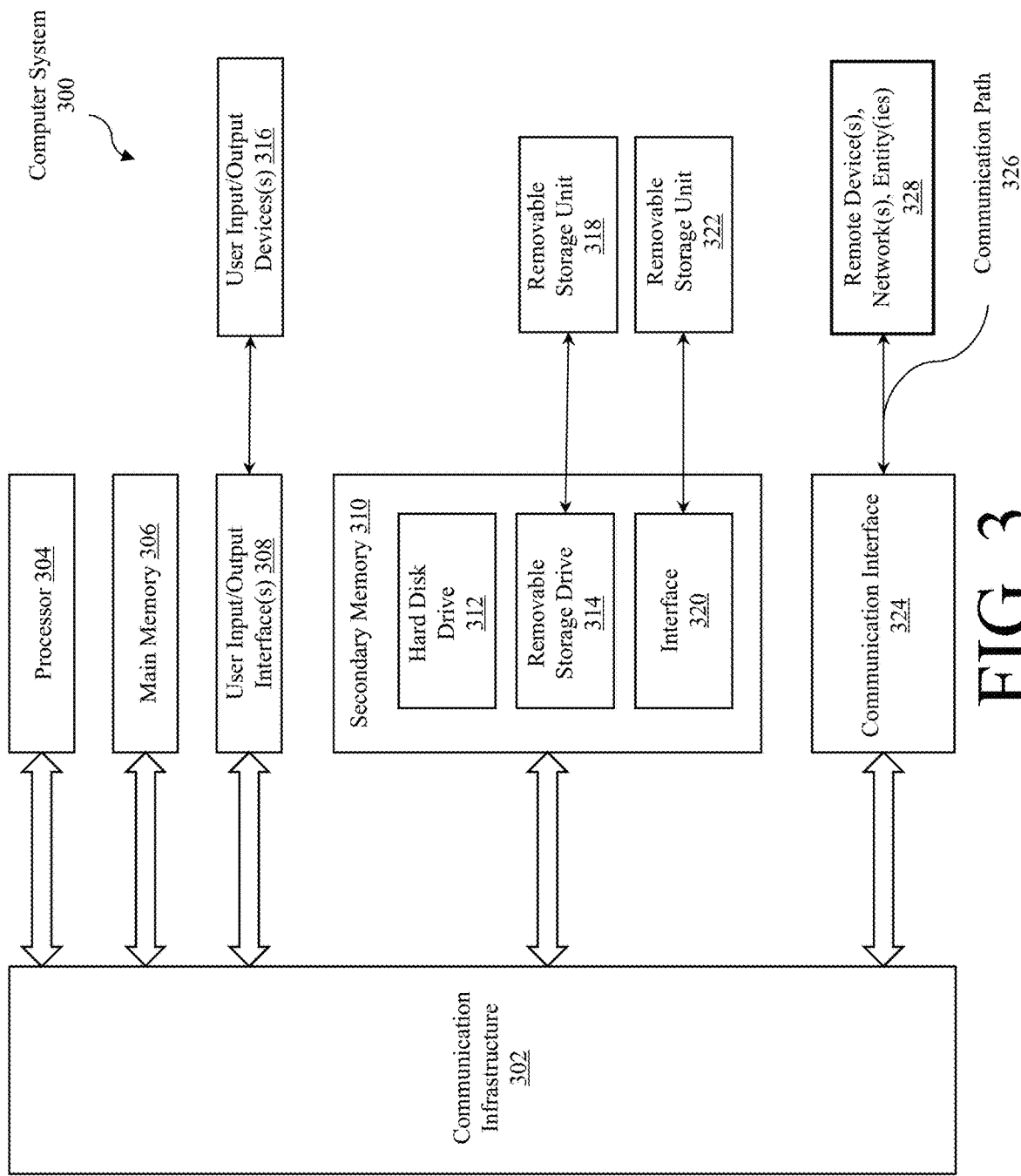
FIG. 3 is an illustration of an illustrative computing device.

The present solution can be implemented, for example, using one or more computer systems, such as computer system 300 shown in FIG. 3. Computer system 300 can be any computer capable of performing the functions described herein. The on-board computing device 122 of FIG. 1, computing device 110 of FIG. 1, robotic device(s) 152 of FIG. 1, mobile communication device(s) 156 of FIG. 1, and/or the vehicle on-board computing device 220 of FIG. 2 may be the same as or similar to computing system 300. As such, the discussion of computing system 300 is sufficient for understanding the devices 110, 122, 152, 156 and 220 of FIGS. 1-2.

Computing system 300 may include more or less components than those shown in FIG. 3. However, the components shown are sufficient to disclose an illustrative solution implementing the present solution. The hardware architecture of FIG. 3 represents one implementation of a representative computing system configured to operate a vehicle, as described herein. As such, the computing system 300 of FIG. 3 implements at least a portion of the method(s) described herein.

Some or all components of the computing system 300 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

Computer system 300 includes one or more processors (also called central processing units, or CPUs), such as a processor 304. Processor 304 is connected to a communication infrastructure or bus 302. One or more processors 304 may each be a graphics processing unit (GPU). In some scenarios, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 316, such as monitors, keyboards, pointing devices, etc., that communicate with communication infrastructure 302 through user input/output interface(s) 308. Computer system 300 further includes a main or primary memory 306, such as random access memory (RAM). Main memory 306 may include one or more levels of cache. Main memory 306 has stored therein control logic (i.e., computer software) and/or data.

One or more secondary storage devices or memories 310 may be provided with computer system 300. Secondary memory 310 may include, for example, a hard disk drive 312 and/or a removable storage device or drive 314. Removable storage drive 314 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be an external hard drive, a universal serial bus (USB) drive, a memory card such as a compact flash card or secure digital memory, a floppy disk, a magnetic tape, a compact disc, a DVD, an optical storage disk, and/or any other computer data storage device. Removable storage drive 314 reads from and/or writes to removable storage unit 314 in a well-known manner.

In some scenarios, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In some scenarios, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 300, main memory 306, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use the present solution using data processing devices, computer systems and/or computer architectures other than that shown in FIG. 3. In particular, the present solution can operate with software, hardware, and/or operating system implementations other than those described herein.

Figure 4:
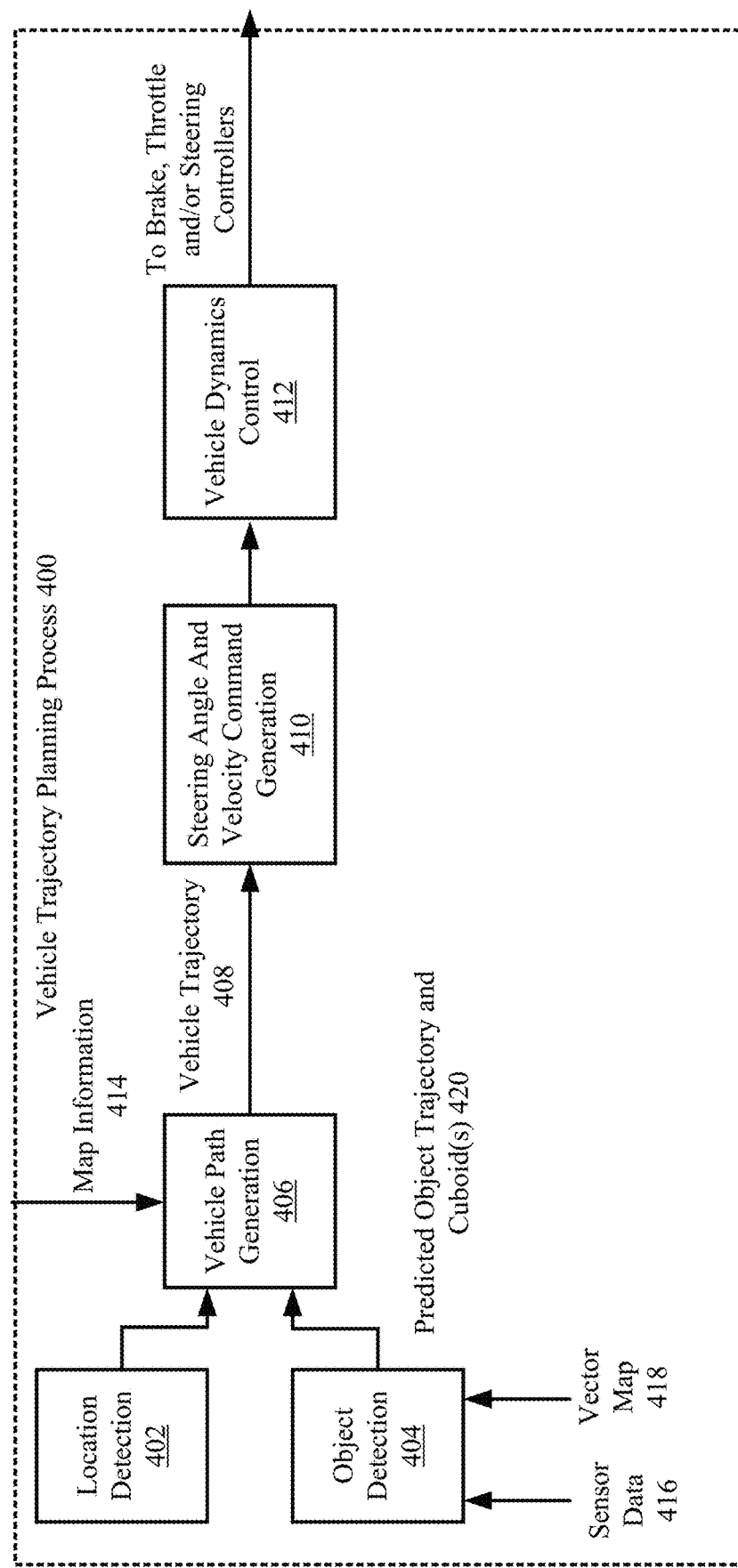
FIG. 4 provides a block diagram of an illustrative vehicle trajectory planning process.

FIG. 4 provides a block diagram that is useful for understanding how motion or movement of an AV is achieved in accordance with the present solution. All of the operations performed in blocks 402-412 can be performed by the on-board computing device (for example, on-board computing device 122 of FIG. 1 and/or 220 of FIG. 2) of a vehicle (for example, AV 102 of FIG. 1).

In block 402, a location of the AV (for example, AV 102 of FIG. 1) is detected. This detection can be made based on sensor data output from a location sensor (for example, location sensor 260 of FIG. 2) of the AV. This sensor data can include, but is not limited to, GPS data. The detected location of the AV is then passed to block 406.

In block 404, an object (for example, vehicle 103 of FIG. 1) is detected within proximity of the AV (for example, <100+ meters). This detection is made based on sensor data output from a camera (for example, camera 262 of FIG. 2) of the AV and/or a lidar system (for example, lidar system 264 of FIG. 2) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 404 for the object. The object's trajectory is predicted in block 404 based on the object's class, cuboid geometry(ies), cuboid heading(s) and/or contents of a map 418 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 418 (for example, lane geometries). Techniques for predicting object trajectories based on cuboid geometries and headings may include, for example, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 420 specifying the object's predicted trajectory, the cuboid geometry(ies)/heading(s) is provided to block 406. In some scenarios, a classification of the object is also passed to block 406. In block 406, a vehicle trajectory is generated using the information from blocks 402 and 404. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 420 can be determined based on the location information from block 402, the object detection information from block 404, and/or map information 414 (which is pre-stored in a data store of the vehicle). The map information 414 may include, but is not limited to, all or a portion of road map(s) 160 of FIG. 1. The vehicle trajectory 420 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 420 is then provided to block 408.

In block 408, a steering angle and velocity command is generated based on the vehicle trajectory 420. The steering angle and velocity command are provided to block 410 for vehicle dynamics control, i.e., the steering angle and velocity command causes the AV to follow the vehicle trajectory 408.

Figure 5:
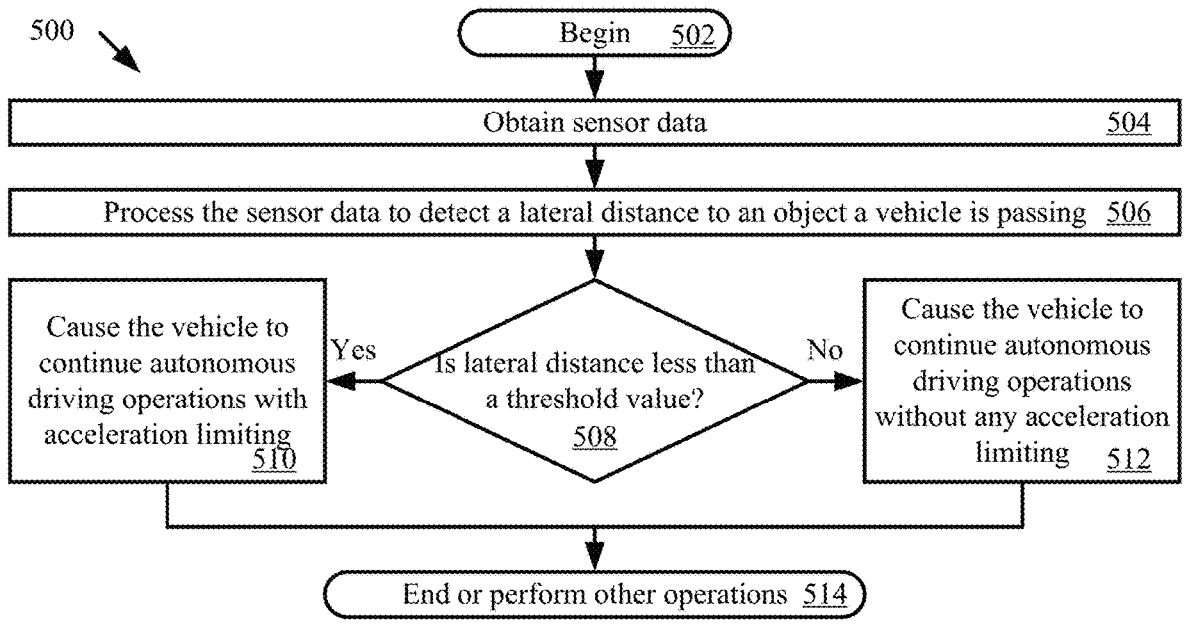
FIG. 5 provides a flow diagram of an illustrative method for selectively controlling longitudinal acceleration of a vehicle.

FIG. 5 provides a flow diagram of an illustrative method 500 for selectively controlling longitudinal acceleration of a vehicle (for example, vehicle 102 of FIG. 1). Method 500 can be performed at least partially by an on-board computing device (for example, on-board computing device 122 of FIG. 1 and/or vehicle on-board computing device 220 of FIG. 2) of the vehicle and/or another computing device (for example, server 110 of FIG. 1 and/or computer system 300 of FIG. 3).

Figure 6:
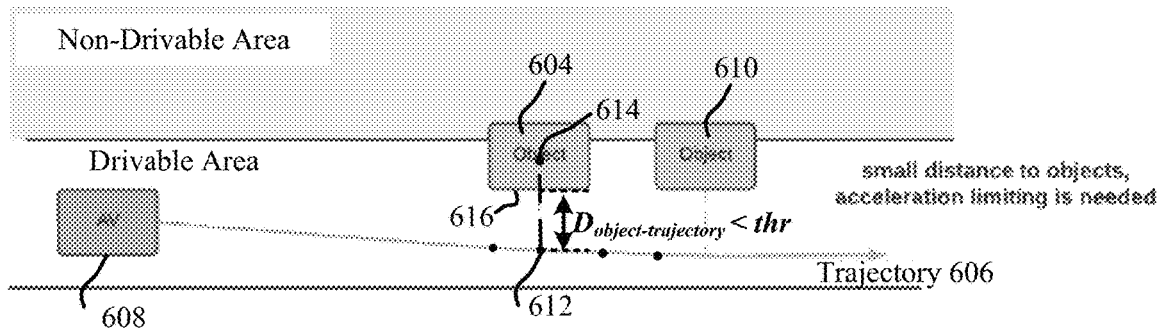
FIGS. 6-7 each provides an illustration that is useful for understanding when acceleration limiting may be selectively performed.
Figure 7:
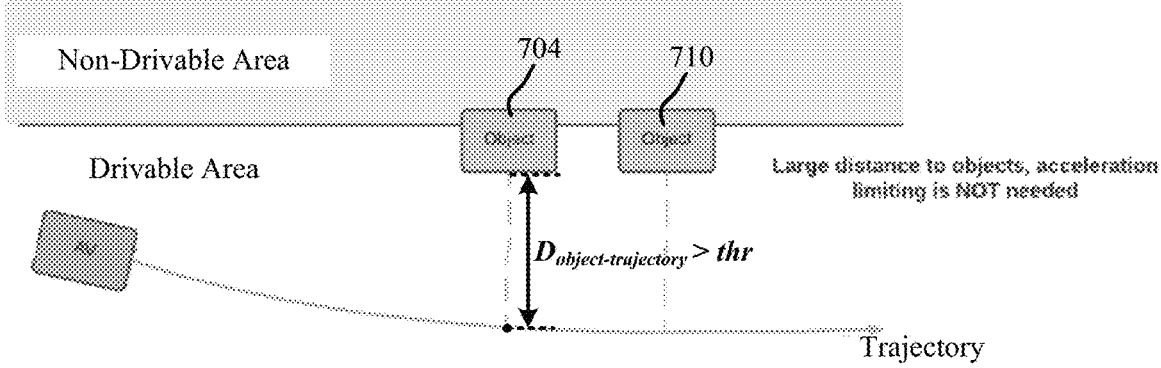

Method 500 begins with 502 and continues with 504 where the computing device obtains sensor data. The sensor data can include data generated by one or more sensors (for example, sensor system 118 of FIG. 1 and/or sensor(s) 236-242, 260-268 of FIG. 2) of the vehicle. The sensor data is processed by the computing device in 506 to detect a lateral distance between an index point on the vehicle's trajectory and an object that the vehicle is passing. For example, as shown in FIG. 6, a vehicle 608 has a trajectory 606 which passes objects 604, 610. The trajectory 606 comprises a plurality of index points that are interconnected. The computing device detects the lateral distance $D_{object-trajectory}$ for each object 604, 610 by, for example: identifying an index point 612 of the vehicle trajectory that is aligned with a center 614 or Center of Gravity (CoG) of the object; determining a smallest distance between the index point 612 and a closest edge 616 of the object; and considering the distance as the lateral distance for the object. The present solution is not limited to the particulars of this example. FIG. 7 shows a scenario in which the lateral distance associated with objects 704, 710 is greater than the lateral distance associated with object 604, 610 of FIG. 6.

In 508, the lateral distance is compared to a threshold value thr. The threshold value thr may be pre-defined and/or selected from a plurality of threshold values based on the type of object and/or other criteria (for example, vehicle speed, etc.). The threshold value(s) may be stored in a Look Up Table (LUT) format or other format in a memory (for example, memory 306 and/or 310 of FIG. 3) of the computing device. For example, the threshold value(s) may be any number (integer or decimal) equal to or greater than zero and less than or equal to five, ten, fifteen, twenty or twenty-five. The present solution is not limited in this regard.

When the lateral distance is less than the threshold value [508:YES], method 500 continues with 510 where the vehicle is caused to continue autonomous driving operations with acceleration limiting. The autonomous driving operations can include, but not limited to, following a previously published path and/or trajectory via steering, acceleration, and/or braking as discussed above in relation to FIG. 4. The manner in which the acceleration limiting is achieved will become evident as the discussion progresses. The amount of acceleration limiting may be the same or different for various scenarios as will be described below. This scenario is shown in FIG. 6 where the lateral distance $D_{object-trajectory}$ is less than the threshold value thr.

In contrast, when the lateral distance is greater than or equal to the threshold value [508:NO], method 500 continues with 512 where the vehicle is caused to continue autonomous driving operations without any acceleration limiting. The autonomous driving operations can include, but not limited to, following a previously published path and/or trajectory via steering, acceleration, and/or braking as discussed above in relation to FIG. 4. This scenario is shown in FIG. 7 where the lateral distance $D_{object-trajectory}$ is greater than the threshold value thr.

Subsequently, 514 is performed where method 500 ends or other operations are performed. For example, method 500 could return to 504 so that another iteration thereof is performed using new or updated sensor data.

Figure 8:
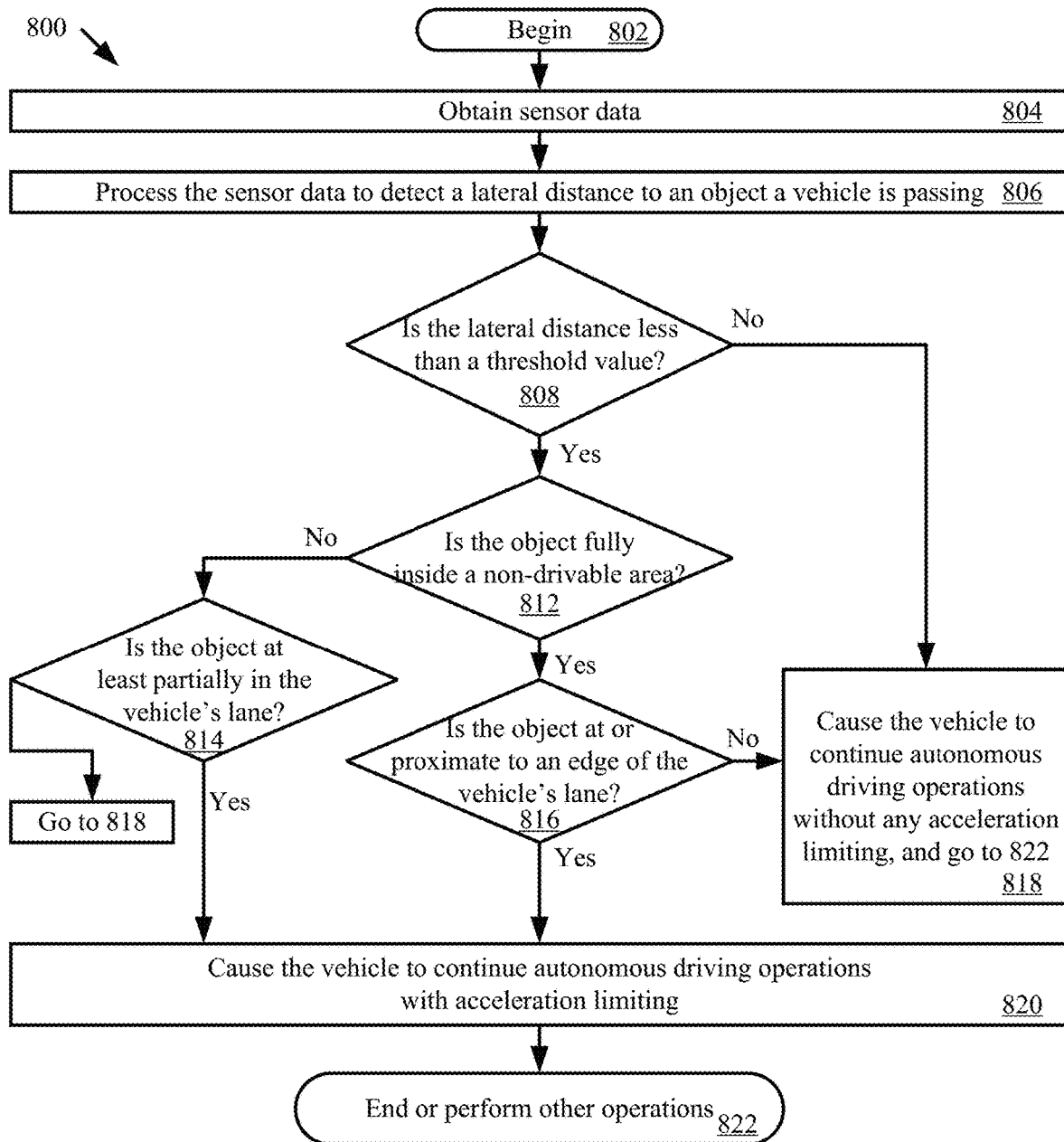
FIG. 8 provides a flow diagram of another illustrative method for selectively controlling longitudinal acceleration of a vehicle.

FIG. 8 provides a flow diagram of another method 800 for selectively controlling longitudinal acceleration of a vehicle (for example, vehicle 102 of FIG. 1). Method 800 can be performed at least partially by an on-board computing device (for example, on-board computing device 122 of FIG. 1 and/or vehicle on-board computing device 220 of FIG. 2) of the vehicle and/or another computing device (for example, server 110 of FIG. 1 and/or computer system 300 of FIG. 3).

Method 800 begins with 802 and continues with 804-808, 818. The operations of these blocks are the same as or similar to those of blocks 504-508, 512 of FIG. 5. The difference between methods 500 and 800 is that in method 800 additional operations are performed when the lateral distance is less than the threshold value. The additional operations include analyzing the sensor data to determine whether the object is fully inside a non-drivable area as shown by decision block 812. A non-drivable area comprises an area in which the vehicle is not authorized or is unable to drive. Such an area can include, but is not limited to, sidewalk(s) and/or green space(s). The non-drivable area may be located adjacent to and/or abut a drivable area. The drivable area comprises an area in which the vehicle is authorized or is able to drive. Such an area can include, but is not limited to, road(s), lane(s), driveway(s) and parking lot(s).

When the object is at least partially outside of the non-drivable area [812:NO], the computing device further analyzes the sensor data in 814 to determine whether the object is at least partially in the vehicle's lane. If not [814:NO], then method 800 continues with 818 where the vehicle is caused to continue autonomous driving operations without any acceleration limiting. If so [814:YES], then method 800 continues with 820 where the vehicle is caused to continue with autonomous driving operations with acceleration limiting. The manner in which the acceleration limiting is achieved will become evident as the discussion progresses. The amount of acceleration limiting may be the same or different for various scenarios as will be described below. Subsequent to completing 818 or 820, method 800 continues with 822 where method 800 ends or other operations are performed (for example, returns to 804).

When the object is at least partially outside of the non-drivable area [812:YES], the computing device further analyzes the sensor data in 816 to determine whether the object is at or proximate to an edge of the vehicle's lane. If not [816:NO], then method 800 continues with 818 where the vehicle is caused to continue autonomous driving operations without any acceleration limiting. If so [816:YES], then method 800 continues with 820 where the vehicle is caused to continue with autonomous driving operations with acceleration limiting. The manner in which the acceleration limiting is achieved will become evident as the discussion progresses. The amount of acceleration limiting may be the same or different for various scenarios as will be described below. Subsequent to completing 818 or 820, method 800 continues with 822 where method 800 ends or other operations are performed (for example, returns to 804).

Figure 9:
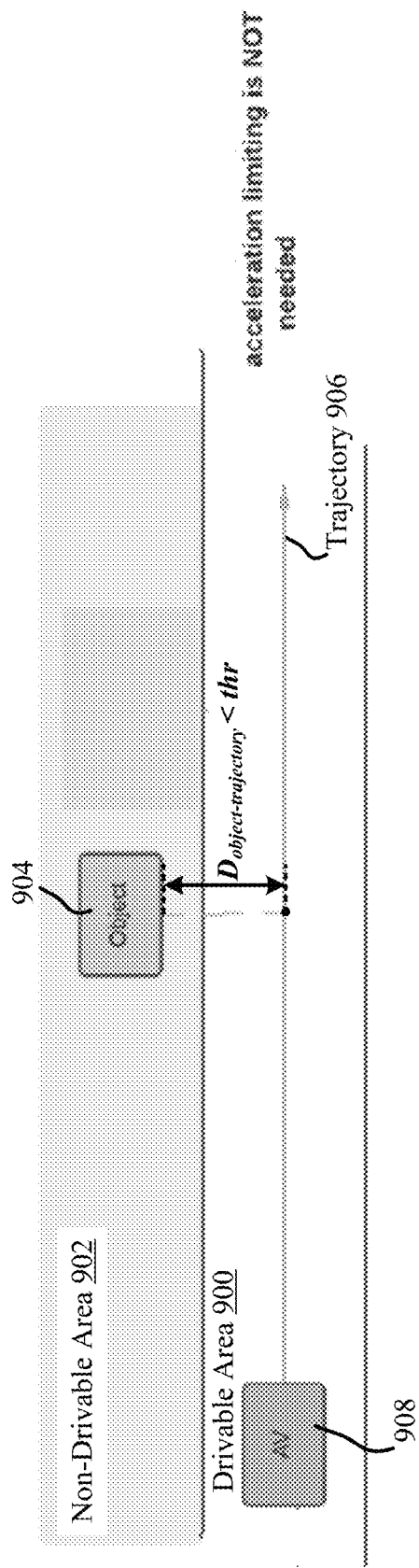
FIGS. 9-11 each provides an illustration that is useful for understanding when acceleration limiting may be selectively performed.

FIG. 9 provides an illustration that is useful for understanding when acceleration limiting is not needed in accordance with method 800. As shown in FIG. 9, a vehicle 908 is following a trajectory 906 through a drivable area 900 (for example, a lane of a road). In effect, the vehicle 908 is going to pass an object 904 which is entirely located within a non-drivable area 902. In this case, the computing device determines that acceleration limiting is not needed even though the lateral distance associated with the object is less than the threshold value (i.e., $D_{object-trajectory} <$thr). The present solution is not limited to the particulars of FIG. 9.

Figure 10:
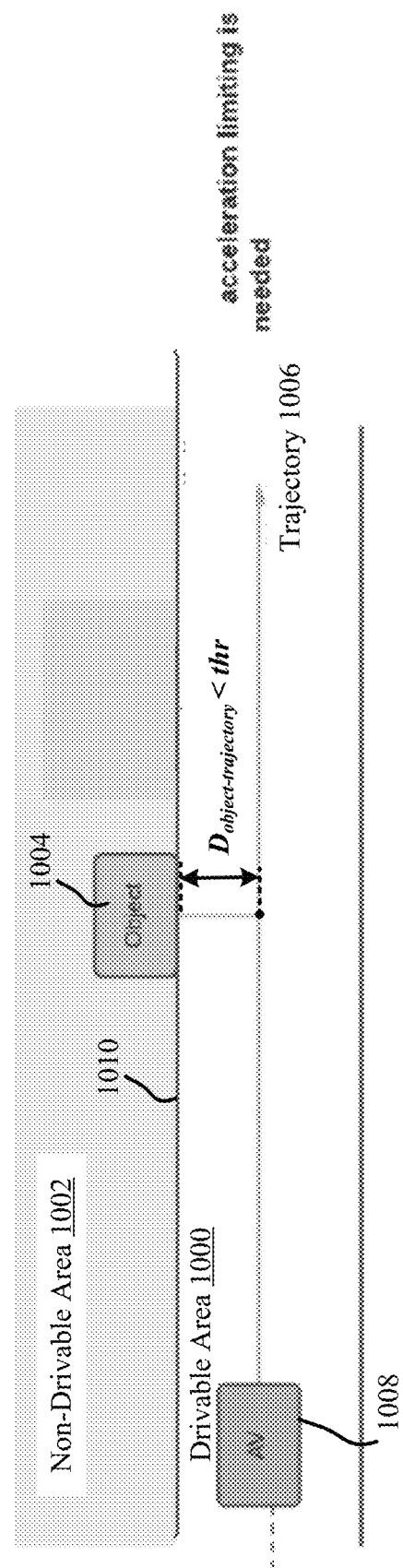

FIG. 10 provides another illustration that is useful for understanding when acceleration limiting is not needed in accordance with method 800. As shown in FIG. 10, a vehicle 1008 is following a trajectory 1006 through a drivable area 1000 (for example, a lane of a road). In effect, the vehicle 1008 is going to pass an object 1004. Object 1004 is entirely located within a non-drivable area 1002 but resides at an edge 1010 of the non-drivable area abutting the vehicle's lane. In this case, the computing device determines that acceleration limiting is needed even though the object is entirely located within the non-drivable area 1002. The present solution is not limited to the particulars of FIG. 10.

Figure 11:
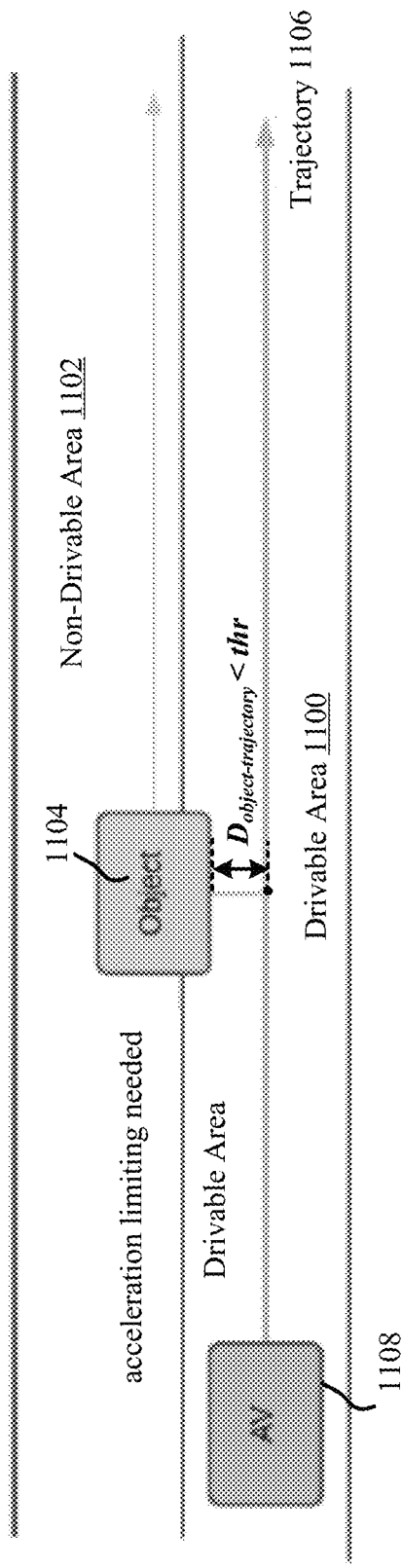

FIG. 11 provides another illustration that is useful for understanding when acceleration limiting is not needed in accordance with method 800. As shown in FIG. 11, a vehicle 1108 is following a trajectory 1106 through a drivable area 1100 (for example, a lane of a road). In effect, the vehicle 1108 is going to pass an object 1104. Object 1104 is partially located outside of a non-drivable area 1102 and partially inside the drivable area 1100. In this case, the computing device determines that acceleration limiting is needed. The amount by which the vehicle's acceleration is limited here is different than (for example, more than) the amount by which the vehicle's acceleration is limited in the scenario of FIG. 10. In effect, the vehicle's acceleration in FIG. 11 may be different than (for example, smaller than) the vehicle's acceleration in FIG. 10. The present solution is not limited to the particulars of FIG. 11.

Figure 12:
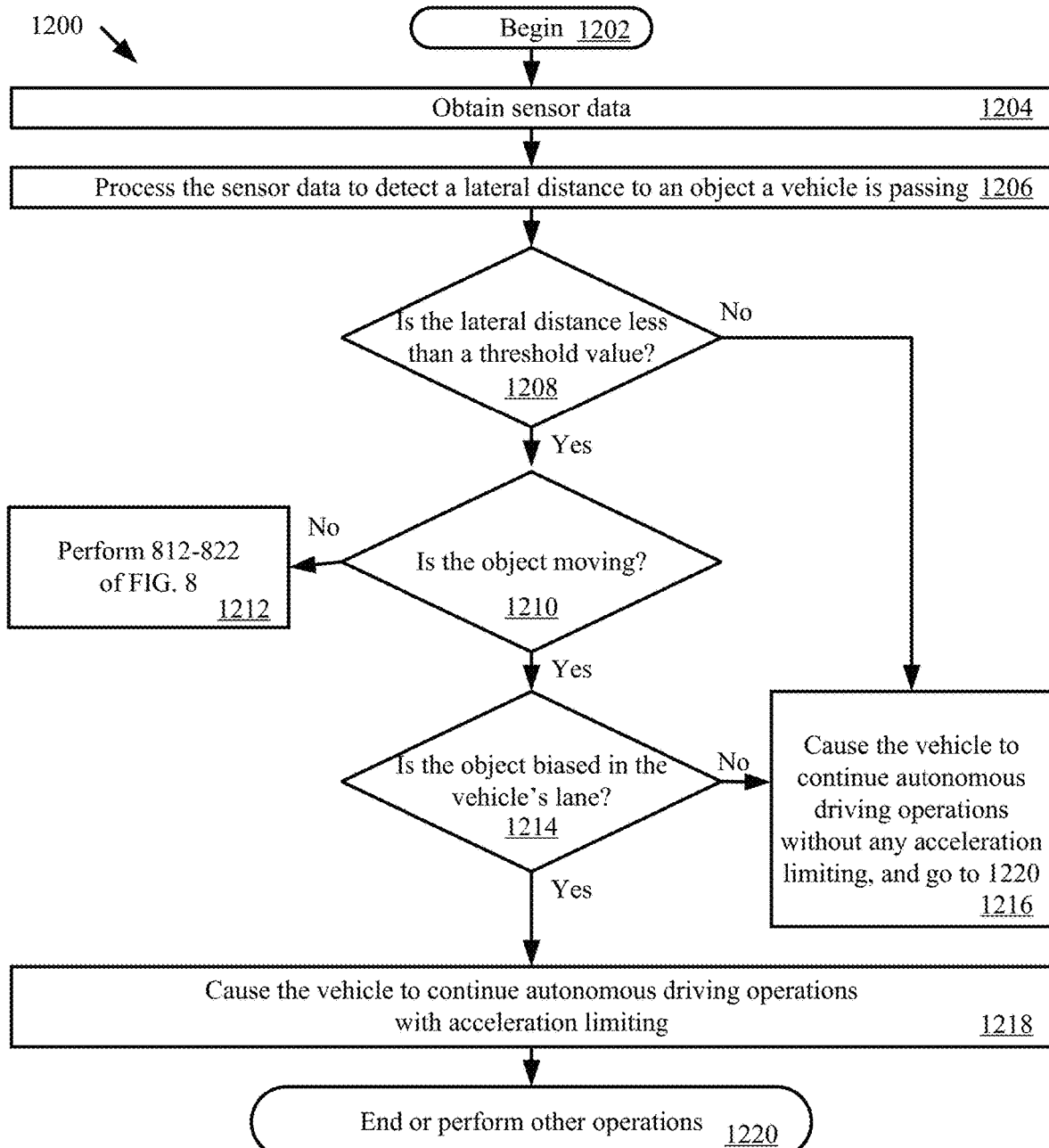
FIG. 12 provides a flow diagram of another illustrative method for selectively controlling longitudinal acceleration of a vehicle.

Referring now to FIG. 12, there is provided a flow diagram of another method 1200 for selectively controlling longitudinal acceleration of a vehicle (for example, vehicle 102 of FIG. 1). Method 1200 can be performed at least partially by an on-board computing device (for example, on-board computing device 122 of FIG. 1 and/or vehicle on-board computing device 220 of FIG. 2) of the vehicle and/or another computing device (for example, server 110 of FIG. 1 and/or computer system 300 of FIG. 3).

Method 1200 begins with 1202 and continues with 1204-1208, 1216. The operations of these blocks are the same as or similar to those of blocks 504-508, 512 of FIG. 5. The difference between methods 500 and 1200 is that in method 1200 additional operations are performed when the lateral distance is less than the threshold value. The additional operations include analyzing the sensor data to determine whether the object is moving or stationary as shown by decision block 1210. When the object is stationary [1210:NO], the operations of blocks 812-822 of FIG. 8 may be performed as shown by block 1212.

When the object is moving [1210:YES], computing device further analyzes the sensor data to determine whether the moving object is biased in the vehicle's lane as shown by 1214. If not [1214:NO], then method 1200 continues with 1216 where the vehicle is caused to continue with autonomous vehicle driving operations without any acceleration limiting. If so [1214:YES], then method 1200 continues with 1211 where the vehicle is caused to continue with autonomous vehicle driving operations with acceleration limiting. The manner in which acceleration limiting is achieved will become more evident as the discussion progresses. Subsequent to completing 1216 or 1218, 1220 is performed where method 1200 ends or other operations are performed (for example, returns to 1204).

Figure 13:
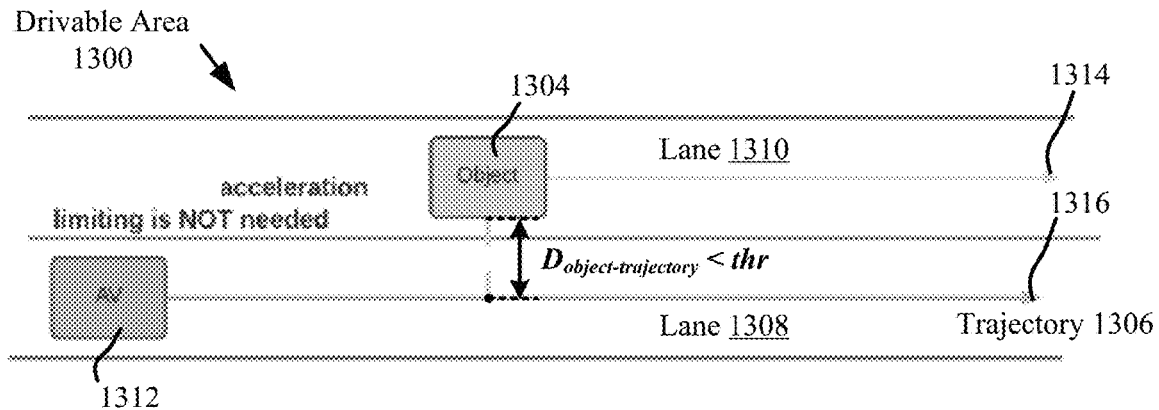
FIGS. 13-15 each provides an illustration that is useful for understanding when acceleration limiting may be selectively performed.

Referring now to FIG. 13, there is provided an illustration that is useful for understanding when acceleration limiting is not needed in accordance with method 1200. As shown in FIG. 13, a vehicle 1312 is following a trajectory 1306 through a drivable area 1300 (for example, a multi-lane road). The vehicle 1312 is going to pass an object 1304 which is entirely located within the drivable area 1300. The lateral distance associated with object 1304 is less than the threshold value. The object 1304 is moving in a lane 1310 which is adjacent to the lane 1308 in which the vehicle 1312 is traveling. The object 1304 and vehicle 1312 are traveling the same direction as shown by arrows 1314, 1316. In this case, the computing device determines that acceleration limiting is not needed even though the lateral distance associated with the object is less than the threshold value (i.e., $D_{object\text{-}trajectory} < thr$). The present solution is not limited to the particulars of FIG. 13.

Figure 14:
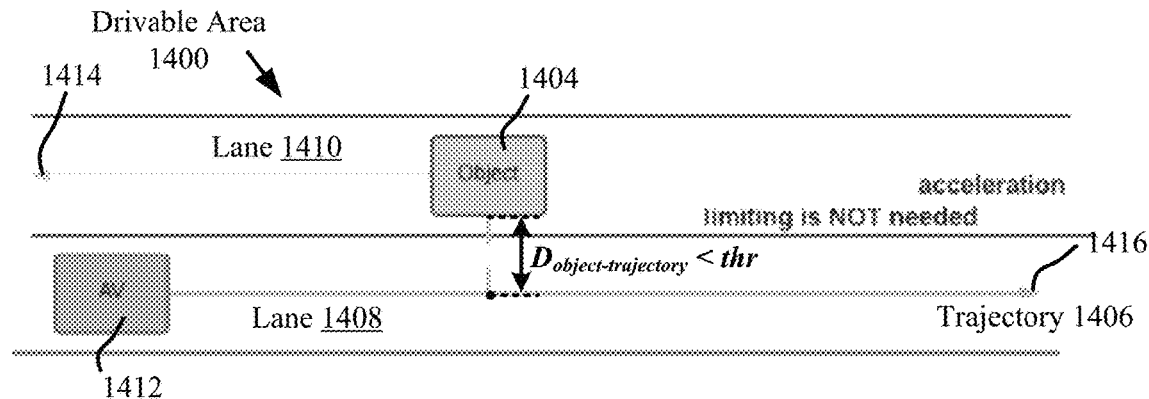

Referring now to FIG. 14, there is provided an illustration that is useful for understanding when acceleration limiting is not needed in accordance with method 1200. As shown in FIG. 14, a vehicle 1412 is following a trajectory 1406 through a drivable area 1400 (for example, a multi-lane road). The vehicle 1412 is going to pass an object 1404 which is entirely located within the drivable area 1400. The lateral distance associated with object 1404 is less than the threshold value. The object 1404 is moving in a lane 1410 which is adjacent to the lane 1408 in which the vehicle 1412 is traveling. The object 1404 and vehicle 1412 are traveling in opposite directions as shown by arrows 1414, 1416. In this case, the computing device determines that acceleration limiting is not needed even though the lateral distance associated with the object is less than the threshold value (i.e., $D_{object\text{-}trajectory} < thr$). The present solution is not limited to the particulars of FIG. 14.

Figure 15:
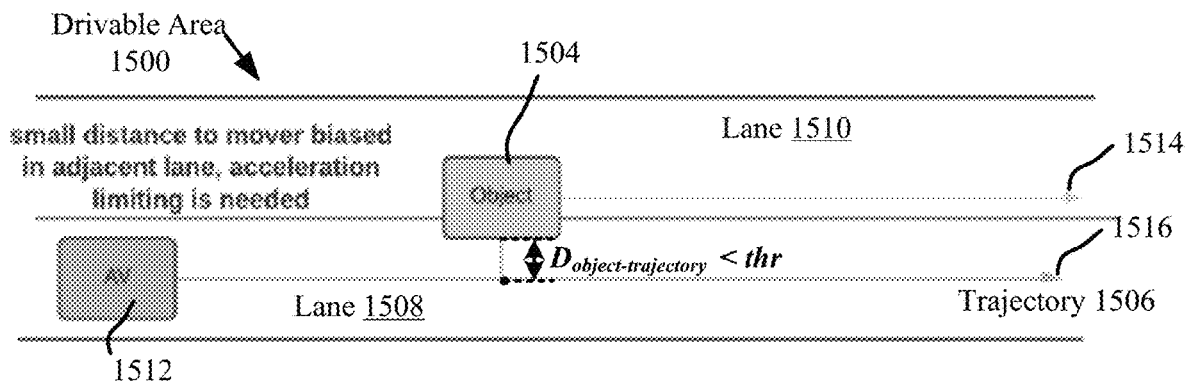

Referring now to FIG. 15, there is provided an illustration that is useful for understanding when acceleration limiting is not needed in accordance with method 1200. As shown in FIG. 15, a vehicle 1512 is following a trajectory 1506 through a drivable area 1500 (for example, a multi-lane road). The vehicle 1512 is going to pass an object 1504 which is entirely located within the drivable area 1500. The lateral distance associated with object 1504 is less than the threshold value. The object 1504 is moving in a lane 1510 which is adjacent to the lane 1508 in which the vehicle 1512 is traveling. The object 1504 and vehicle 1512 are traveling in opposite directions as shown by arrows 1514, 1516. The object 1504 is biased into the vehicle's lane 1508. In this case, the computing device determines that acceleration limiting is needed. The present solution is not limited to the particulars of FIG. 14.

Figure 16:
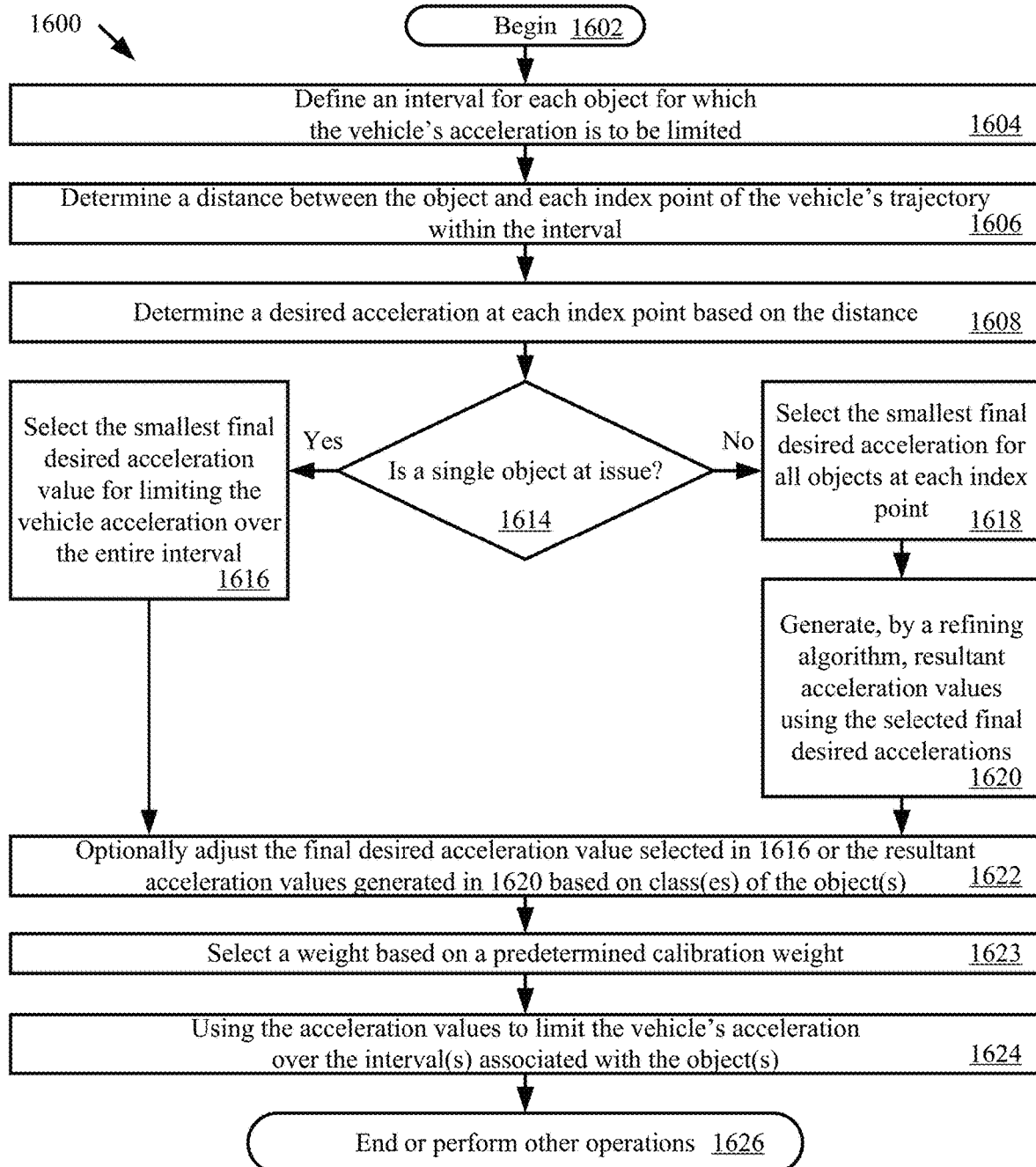
FIG. 16 provides a flow diagram of an illustrative method for determining an amount by which vehicle acceleration is limited.

FIG. 16 provides a flow diagram of a method 1600 for determining an amount by which a vehicle's acceleration is limited. Another such method 1900 will be described below in relation to FIG. 19. Methods 1600, 1900 can be performed in blocks 510 of FIG. 5, 820 of FIG. 8 and/or 1218 of FIG. 12.

Figure 17:
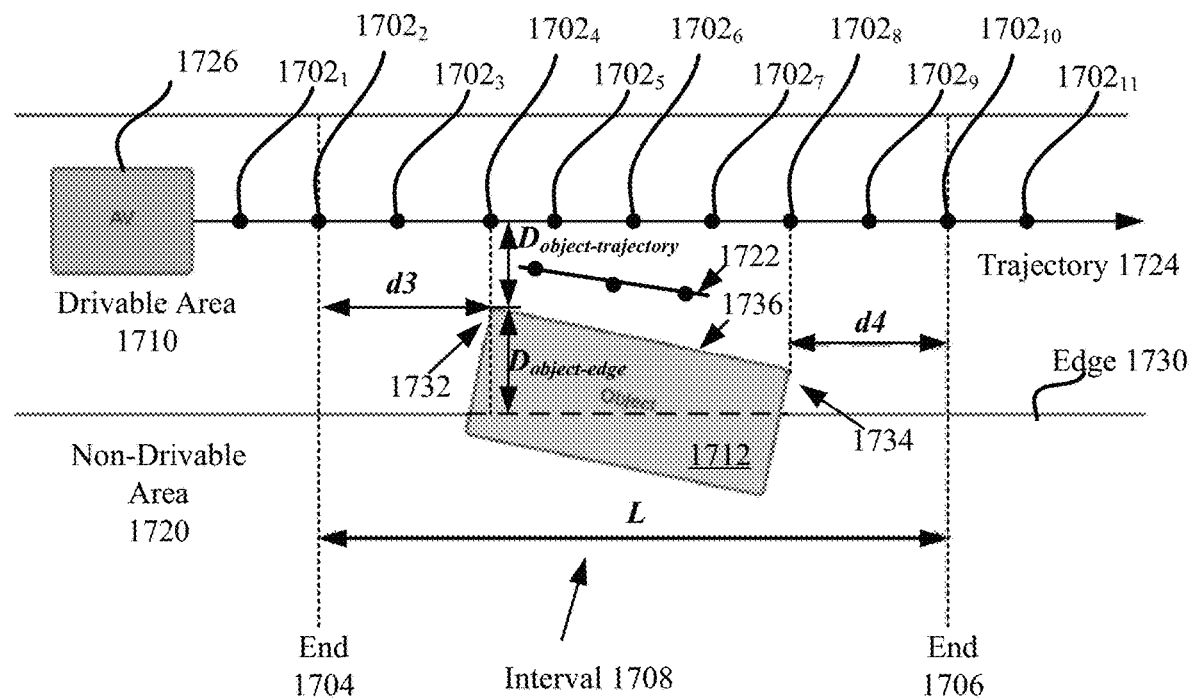
FIG. 17 provides an illustration that is useful for understanding how an amount of acceleration is limited in accordance with the method shown in FIG. 16.
Figure 26:
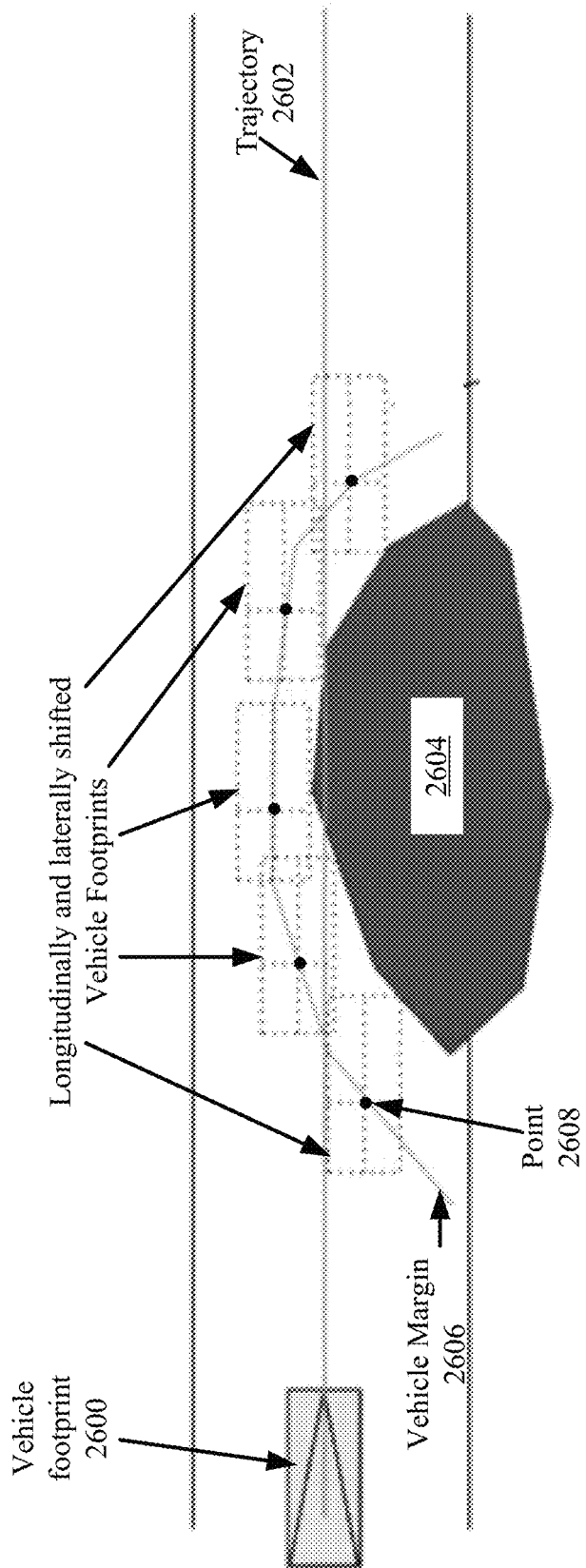
FIG. 26 provides an illustration that is useful for understanding a vehicle's margin.

As shown in FIG. 16, method 1600 begins with 1602 and continues with 1604 where the computing device defines interval(s) in which the vehicle's acceleration is to be limited. The interval is also referred to herein as an acceleration limiting interval. The acceleration limiting interval can have a predefined length with each opposing end a given distance from the object's center and/or respective corner. For example, as shown in FIG. 17, an interval 1708 has a length L, a first end 1704 located a distance d1 from a location of a vehicle's margin 1722, and a second end 1706 located a distance d2 from the vehicle's margin 1722, a distance d3 from a first corner 1732 of the object, and a distance d4 from a second opposing corner 1734 of the object. Distances d1 and d2 are the same. An illustration is provided in FIG. 26 that is useful for understanding the location of the vehicle's margin. The vehicle's margin is a sequence of points that are determined by: sliding a footprint 2600 of the vehicle longitudinally along the trajectory 2602; (for each index point of the trajectory) sliding the footprint 2600 laterally until the footprint intersects with the object 2604; and defining the vehicle's margin 2606 by a line comprising points 2608, where each point represents a vehicle center or center of gravity at a laterally slid location. Distances d1 and d2 are then determined based on the vehicle's margin. The present solution is not limited to the particulars of FIG. 17 and/or FIG. 26.

After 1606, the computing device processes sensor data to determine a distance between the object and each index point of the vehicle's trajectory within the interval. For example, as shown in FIG. 17, a vehicle 1726 is following a trajectory 1724 in a drivable area 1710. The trajectory 1724 comprises a plurality of interconnected index points $1702_1, \ldots, 1702_{11}$. The computing device determines a distance $D_{object\text{-}trajectory}$ for each index $170_2, \ldots, 1702_{10}$ within the interval 1708. The present solution is not limited to the particulars of FIG. 17.

Next in 1608, a desired acceleration is determined for the vehicle at each index point in the interval based on the distance. For example, with reference to FIG. 17, the distance $D_{object\text{-}trajectory}$ associated with index point $1702_4$ is used to obtain a desired acceleration value $A_{desired}$ from a stored LUT(s) or configuration file(s). The present solution is not limited in this regard. In some scenarios, each object type will have a set of configuration files that may be used to determine the desired acceleration for the vehicle. For example, if an object is associated with a pedestrian presence, then the pedestrian presence configuration file is used to obtain the desired acceleration values). The pedestrian presence probability may be used to interpolate between the pedestrian presence parameters versus the object parameters. If an object is associated with a cyclist presence, then the cyclist presence configuration file is used to obtain the desired acceleration values). The cyclist presence probability may be used to interpolate between the cyclist presence parameters versus the object parameters. The present solution is not limited to the particulars of this example.

Next, the computing device performs operations in 1614 to determine whether a single object is at issue. If so [1614:YES], then 1616 is performed where the computing device selects the smallest final desired acceleration value (for example, $A_{desired\text{-}2}$, where $A_{desired\text{-}2} < A_{desired\text{-}1}$, $A_{desired\text{-}3}, \ldots$, and $A_{desired\text{-}N}$) for limiting the vehicle's acceleration over an entire interval (for example, interval 1708 of FIG. 17). The selected desired acceleration value may be optionally adjusted in 1622 based on the class of the object. For example, the acceleration value is reduced by a first pre-defined amount (for example, by 10%) when the object is classified as a pedestrian and reduced by a second different pre-defined amount (for example, by 5%) when the object is classified as a cyclist. The present solution is not limited to the particulars of this example. The acceleration value may alternatively be decreased based on the object's classification. A weight may be selected in 1623 based on a predetermined calibration weight stored in a configuration file. The weight can be, for example, an integer or decimal number between zero and one hundred. The selected desired acceleration value is then used in 1624 to limit the vehicle's acceleration over the interval associated with the object at issue (for example, object 1712 of FIG. 17). Subsequently, 1626 is performed where method 1600 ends or other operations are performed.

When there are two or more objects at issue [1614:NO], then the computing device selects the smallest final desired acceleration for all objects at each index point in the intervals, as shown by 1618. In 1620, the computing device uses a refining algorithm to generate resultant acceleration values using the selected final desired accelerations. The refining algorithm can include, but is not limited to, a machine learning algorithm that is trained to generate resultant acceleration values based on context information derived from sensor data. The context information can include, but is not limited to, relative locations of vehicle and objects, position of vehicle, position of object, vehicle trajectory, predicted object trajectory, object classification, direction of travel for the vehicle, and/or direction of travel for the object. The resultant acceleration values may be optionally adjusted in 1622 based on the class of the object. For example, a resultant acceleration value is reduced by a first pre-defined amount (for example, 0-10%) when the object is classified as a pedestrian and reduced by a second different pre-defined amount (for example, 1-30%) when the object is classified as a cyclist. The present solution is not limited to the particulars of this example. The acceleration value may alternatively be increased based on the object's classification. The selected final desired acceleration value is then used in 1624 to limit the vehicle's acceleration over the interval associated with the object at issue (for example, object 1712 of FIG. 17). Subsequently, 1626 is performed where method 1600 ends or other operations are performed.

Figure 18:
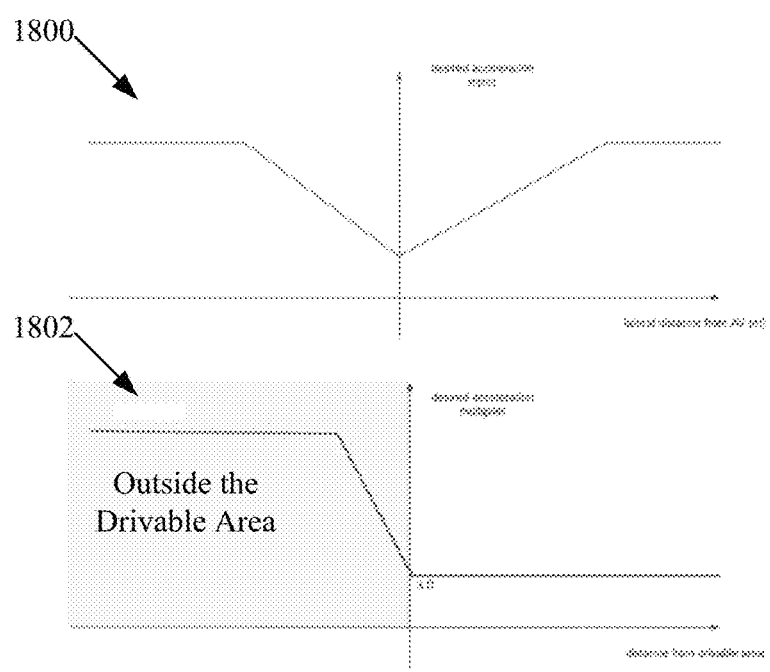
FIG. 18 provides graphs showing how acceleration is limited based on certain criteria.

FIG. 18 provides graphs that are useful for understanding how a vehicle's acceleration may be limited in accordance with method 1600 of FIG. 16. More specifically, graph 1800 illustrates how much to limit a vehicle's acceleration based on lateral distance $D_{object-trajectory}$. Graph 1802 illustrates how much to limit a vehicle's acceleration based on edge distance $D_{object-edge}$.

Figure 19:
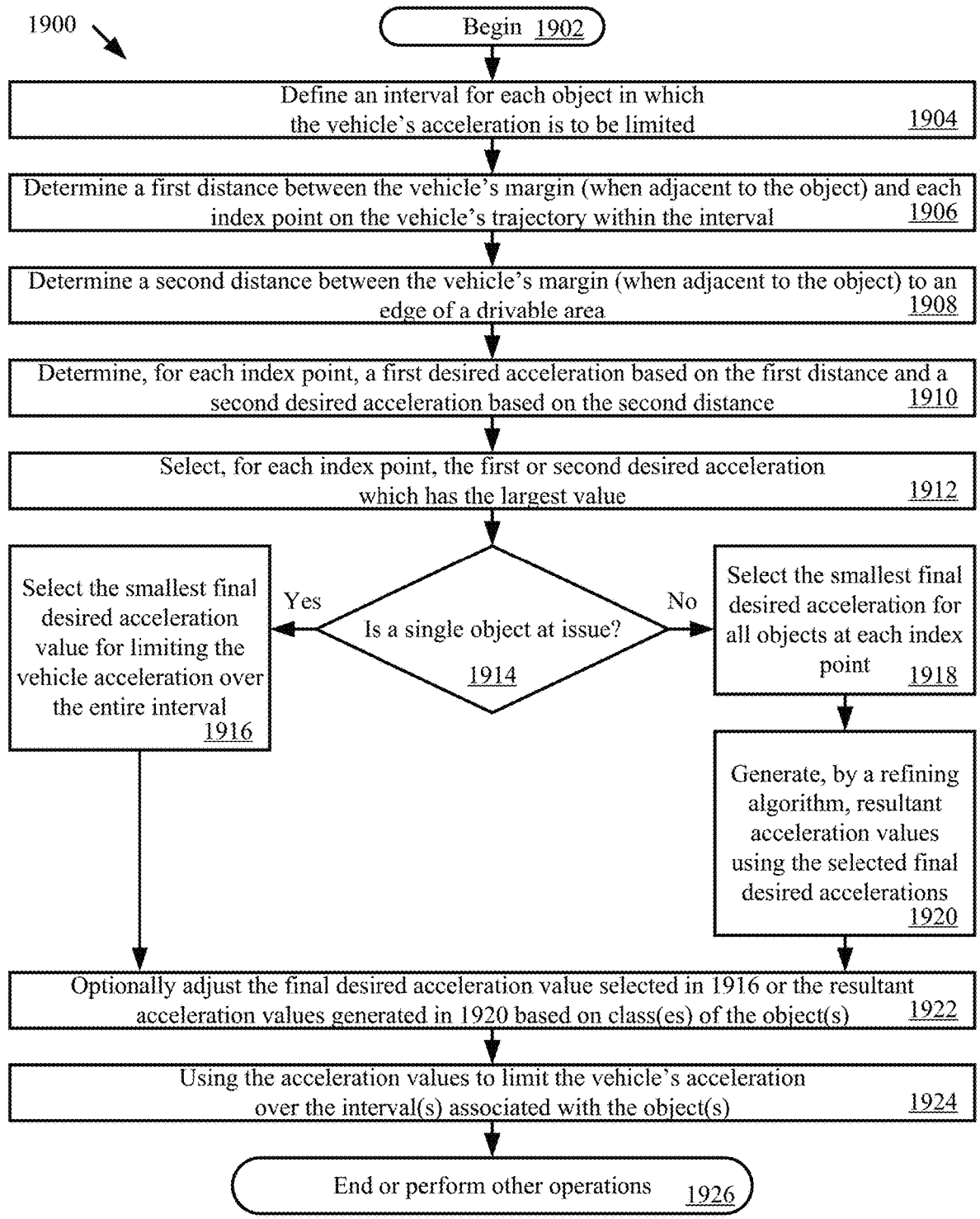
FIG. 19 provides a flow diagram of another illustrative method for determining an amount by which vehicle acceleration is limited.

FIG. 19 provides a flow diagram of another method 1900 for determining an amount by which a vehicle's acceleration is limited. Method 1900 can be performed in blocks 510 of FIG. 5, 820 of FIG. 8 and/or 1218 of FIG. 12.

Figure 20:
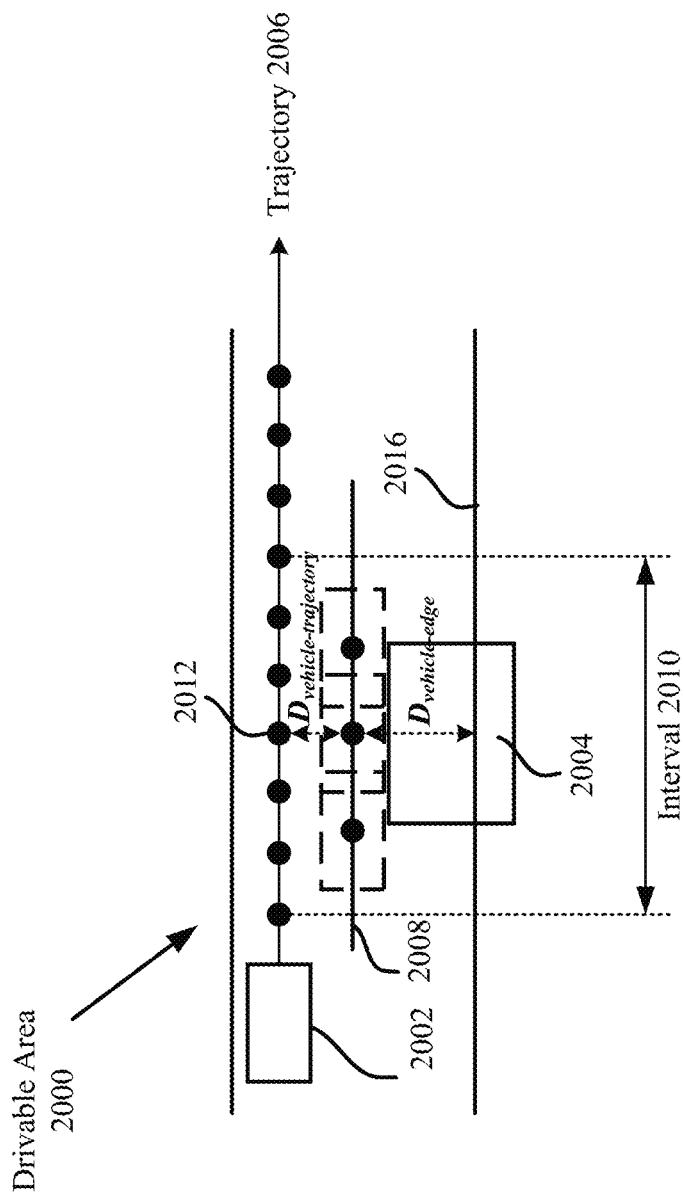
FIG. 20 provides an illustration that is useful for understanding how an amount of acceleration is limited in accordance with the method shown in FIG. 19.

As shown in FIG. 19, method 1900 begins with 1902 and continues with 1904 where the computing device defines interval(s) in which the vehicle's acceleration is to be limited. The interval is also referred to herein as an acceleration limiting interval. The acceleration limiting interval can have a predefined length with each opposing end a given distance from the object's center and/or respective corner. For example, as shown in FIG. 17, an interval 1708 has a length L, a first end 1704 located a distance d1 from the vehicle's margin 1722, and a second end 1706 located a distance d2 from the vehicle's margin 1722, a distance d3 from a first corner 1732 of the object, and a distance d4 from a second opposing corner 1734 of the object. Distances d1 and d2 are the same. The present solution is not limited to the particulars of FIG. 17. Another interval 2010 is shown in FIG. 20.

In 1906, the computing device processes sensor data to determine a first distance between the vehicle's margin when adjacent to the object and each index point on the vehicle's trajectory within the interval. For example, with reference to FIG. 20, the computing device determines the location of the vehicle's margin 2008 if the vehicle is adjacent to the object 2004. The vehicle's margin 2008 is a sequence of points that are determined by: sliding a footprint of the vehicle longitudinally along the trajectory; (for each index point of the trajectory) sliding the footprint laterally until the footprint intersects with the object; and define the vehicle's margin by a line comprising points, where each point represents a vehicle center or center of gravity at a laterally slid location. The distance $D_{vehicle-trajectory}$ is then determined between this location of the vehicle's margin 2008 and an index point 2012 of the vehicle's trajectory 2006. The present solution is not limited to the particulars of FIG. 20.

In 1908, the computing device processes sensor data to determine a second distance between the vehicle's margin when adjacent to the object and an edge of a drivable area. For example, with reference to FIG. 20, the computing device determines a distance $D_{vehicle-edge}$ between the location of the vehicle's margin 2008 and the edge 2016 of the drivable area 2000. The present solution is not limited to the particulars of FIG. 20.

In 1910, the computing device determines, for each index point of the trajectory within the interval(s), a first desired acceleration based on the first distance and a second desired acceleration based on the second distance. For example, with reference to FIG. 20, the distance $D_{vehicle-trajectory}$ associated with index point 2012 is used to obtain a first desired acceleration value from a stored LUT or calibration file, while distance $D_{vehicle-edge}$ is used to obtain a second desired acceleration value from a stored LUT or calibration file. The present solution is not limited in this regard. The computing device selects, for each index point, the first or second desired acceleration value with the largest or maximum value, as shown by 1912. The selected desired acceleration values are referred to as final desired acceleration values.

In 1914, the computing device performs operations to determine whether a single object is at issue. If so [1914: YES], then 1916 is performed where the computing device selects the smallest final desired acceleration value for limiting the vehicle's acceleration over an entire interval (for example, interval 2010 of FIG. 20). The selected final desired acceleration value may be optionally adjusted in 1922 based on the class of the object. For example, the acceleration value is reduced by a first pre-defined amount when the object is classified as a pedestrian and reduced by a second different pre-defined amount when the object is classified as a cyclist. The present solution is not limited to the particulars of this example. The acceleration value may alternatively be increased based on the object's classification. The selected final desired acceleration value is then used in 1924 to limit the vehicle's acceleration over the interval associated with the object at issue (for example, object 2004 of FIG. 20). Subsequently, 1926 is performed where method 1900 ends or other operations are performed.

When there are two or more objects at issue [1914:NO], then the computing device selects the smallest final desired acceleration for all objects at each index point in the intervals, as shown by 1918. In 1920, the computing device uses a refining algorithm to generate resultant acceleration values using the selected final desired accelerations. The refining algorithm can include, but is not limited to, a machine learning algorithm that is trained to generate resultant acceleration values based on context information derived from sensor data. The context information can include, but is not limited to, relative locations of vehicle and objects, position of vehicle, position of object, vehicle trajectory, predicted object trajectory, object classification, direction of travel for the vehicle, and/or direction of travel for the object. The resultant acceleration values may be optionally adjusted in 1922 based on the class of the object. For example, a resultant acceleration value is reduced by a first pre-defined amount when the object is classified as a pedestrian and reduced by a second different pre-defined amount when the object is classified as a cyclist. The present solution is not limited to the particulars of this example. The acceleration value may alternatively be increased based on the object's classification. The selected final desired acceleration value is then used in 1924 to limit the vehicle's acceleration over the interval associated with the object at issue (for example, object 2004 of FIG. 20). Subsequently, 1926 is performed where method 1900 ends or other operations are performed.

Figure 21:
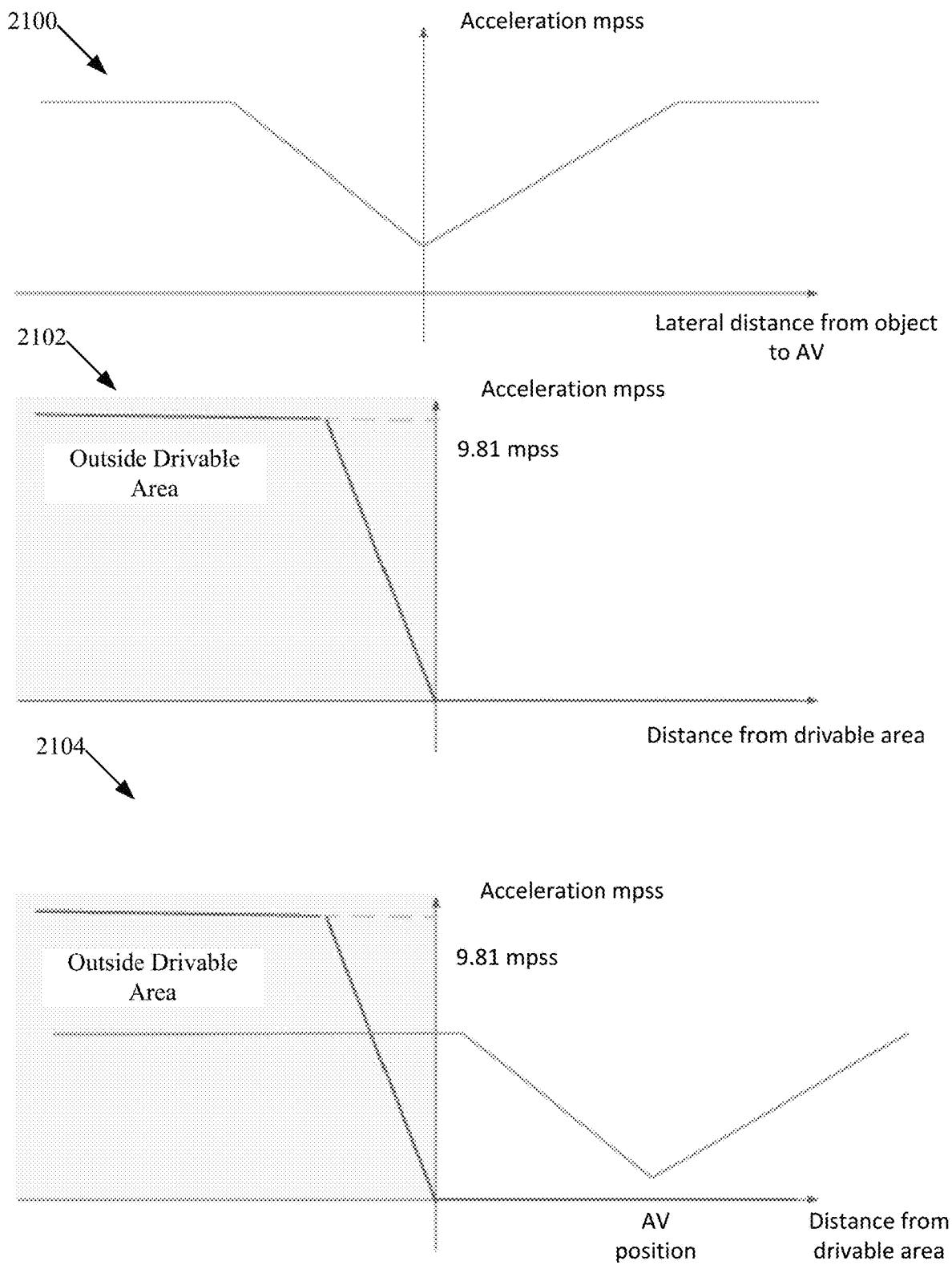
FIG. 21 provides graphs showing how acceleration is limited based on certain criteria.

FIG. 21 provides graphs that are useful for understanding how a vehicle's acceleration may be limited in accordance with method 1900 of FIG. 19. More specifically, graph 2100 illustrates how much to limit a vehicle's acceleration based on distance $D_{vehicle-trajectory}$. Graph 2102 illustrates how much to limit a vehicle's acceleration based on edge distance $D_{vehicle-edge}$. Graph 2104 shows the overlap of graphs 2100 and 2102. The maximum values of the graphs 2100 and 2102 are used to limit the vehicle's acceleration. The present solution is not limited to the particulars of FIG. 21.

Figure 22:
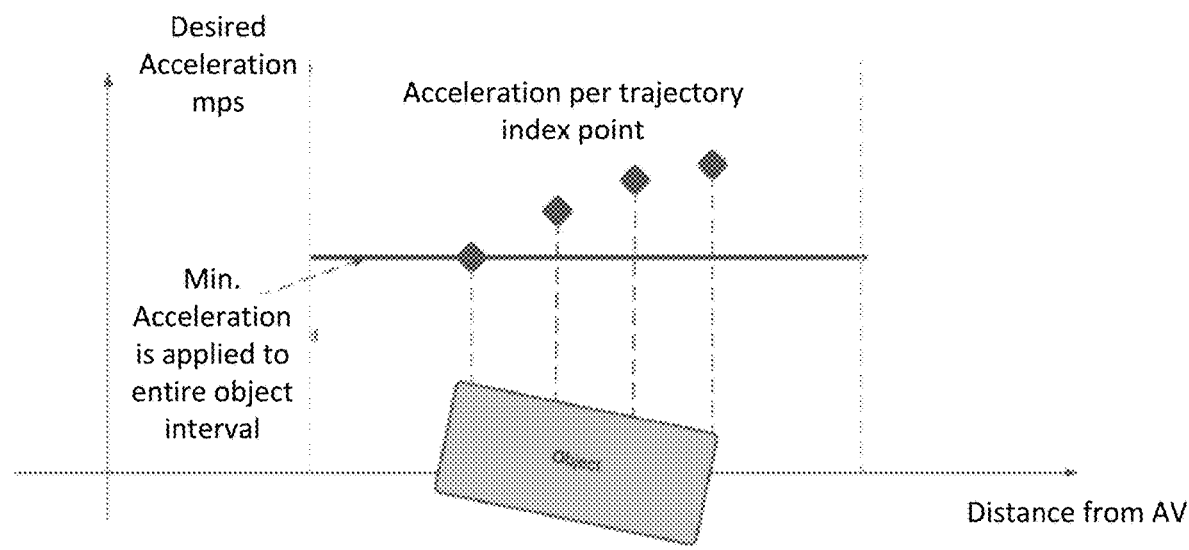
FIG. 22 provides an illustration that is useful for understanding how acceleration is limited when the desired acceleration varies across an object interval.

FIG. 22 provides an illustration that is useful for understanding how a vehicle's acceleration is limited in scenarios where the desired accelerations vary over the interval. In this case, the minimum acceleration is applied over the entire interval to limit the vehicle's acceleration.

Figure 23:
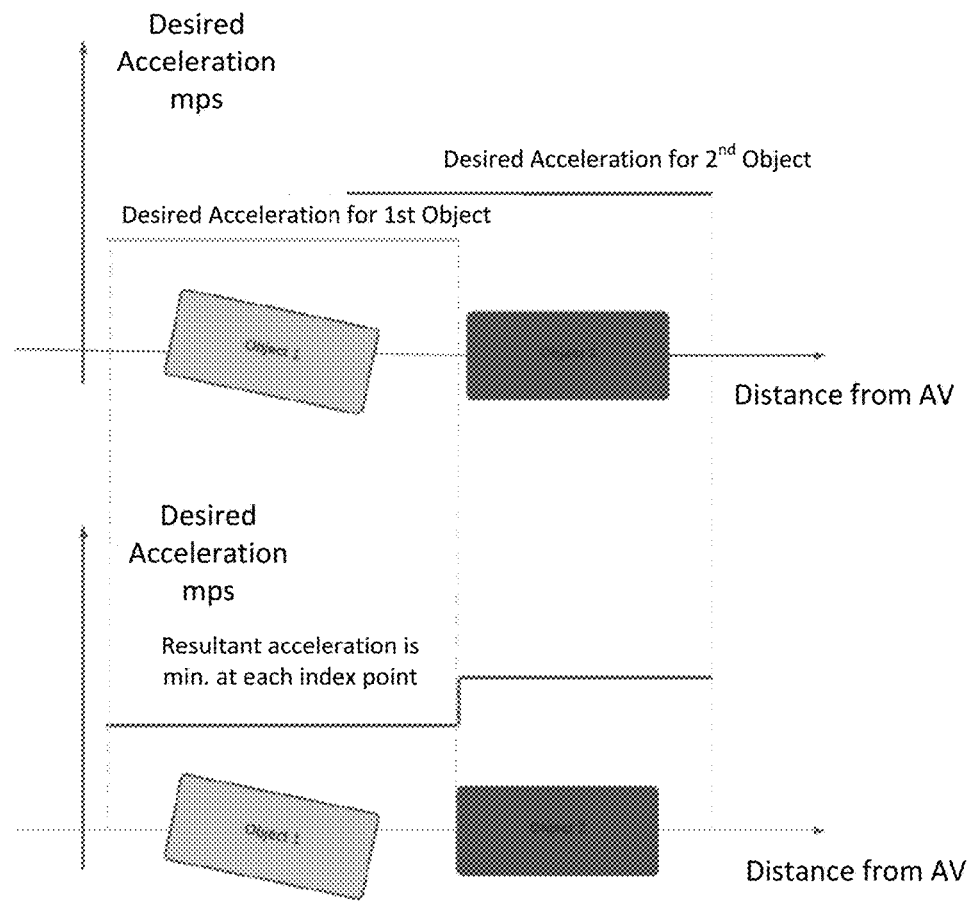
FIG. 23 provides graphs that are useful for understanding how acceleration is limited when two object intervals overlap each other.

FIG. 23 provides an illustration that is useful for understanding how the vehicle's acceleration is limited in scenarios where the vehicle will pass multiple objects. In this case, the minimum acceleration at each index point is used as inputs to a refining algorithm to determine the amounts by which the vehicle's acceleration is to be limited over the intervals associated with the objects.

Figure 24:
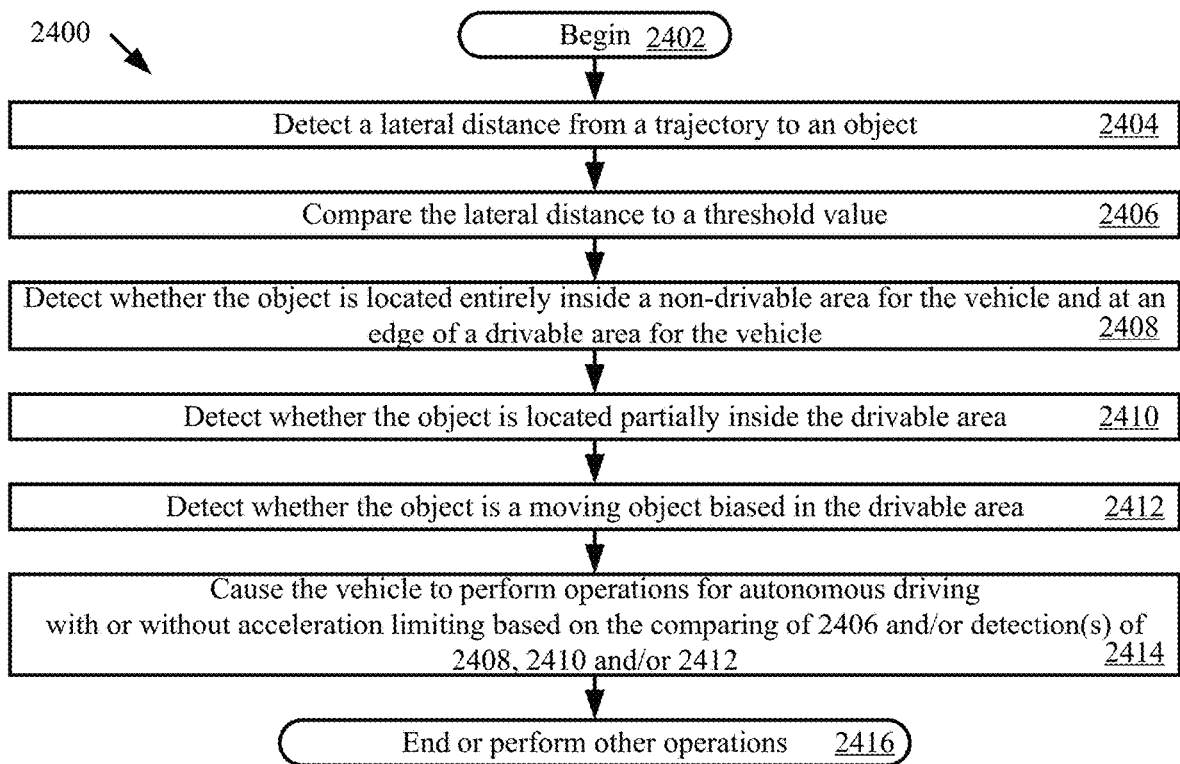
FIG. 24 provides a flow diagram of another method for controlling acceleration of a vehicle.

FIG. 24 provides a flow diagram of another method 2400 for controlling acceleration of a vehicle. Method 2400 can be performed at least partially by an on-board computing device (for example, on-board computing device 122 of FIG. 1 and/or vehicle on-board computing device 220 of FIG. 2) of the vehicle and/or another computing device (for example, server 110 of FIG. 1 and/or computer system 300 of FIG. 3).

Method 2400 begins with 2402 and continues with 2404 where the computing device processes sensor data to detect a lateral distance from a trajectory of the vehicle to an object the vehicle is expected to pass. The lateral distance may be detected by, for example: selecting an index point from a plurality of index points of the trajectory that is aligned with a center of the object; determining a distance between the selected index point and an edge of the object; and considering the distance as the lateral distance. The lateral distance is compared to a threshold value in 2406.

In 2408-2412, the computing device further processes the sensor data to: detect whether the object is located entirely inside a non-drivable area for the vehicle and at an edge of a drivable area for the vehicle; whether the object is located partially inside a drivable area for the vehicle; and/or whether the object is a moving object biased in a drivable area for vehicle.

In 2414, the computing device causes the vehicle to perform operations for autonomous driving with or without acceleration limiting based on results from the comparison operation of 2406, the detection if 2408, the detection of 2410 and/or the detection of 2412. For example, the vehicle is caused to perform operations for autonomous driving with acceleration limiting when (i) the lateral distance is less than the threshold value, (ii) the object is located entirely inside the non-drivable area and at the edge of the drivable area, (iii) the object is located partially inside the drivable area for the vehicle and/or (iv) the object is a moving object biased in the drivable area for the vehicle. Alternatively, the vehicle is caused to perform operations for autonomous driving without acceleration limiting when (i) the lateral distance is greater than the threshold value, (ii) the object is located entirely inside the non-drivable area but away from the edge of the drivable area (iii) the object is not at least partially located inside the drivable area for the vehicle, and/or (iv) the object is not a moving object biased in the drivable area for the vehicle.

2414 can involve obtaining an amount by which the acceleration of the vehicle is to be limited. The amount of acceleration limiting can be obtained by: defining an interval with a first end a given distance from the object and a second opposing the given distance from the object; obtaining a distance between the object and each index point of the trajectory within the interval; obtaining a desired acceleration for each said index point of the trajectory based on the respective one of the distances; and selecting the smallest value from the desired accelerations for limiting acceleration of the vehicle. Each of the desired acceleration may be combined with a weight prior to selecting the smallest desired acceleration. The smallest value may be adjusted based on a class of the object.

The amount of acceleration limiting can alternatively be obtained by: defining an interval with a first end a given distance from the object and a second opposing the given distance from the object; and performing operations for each index point of a plurality of index points of the trajectory that are located in the interval. These operations involve: obtaining a first distance between a vehicle margin when the vehicle is located adjacent to the object and each index point of the trajectory within the interval and a second distance between the vehicle's machine when the vehicle is located adjacent to the object and an edge of drivable area for the vehicle; obtaining a first desired acceleration based on the first distance and a second desired acceleration based on the second distance; and selecting a largest one of the first and second desired accelerations as a final desired acceleration. The smallest value is selected from the final desired accelerations for limiting acceleration of the vehicle. The smallest value may be adjusted based on a class of the object.

Figure 25:
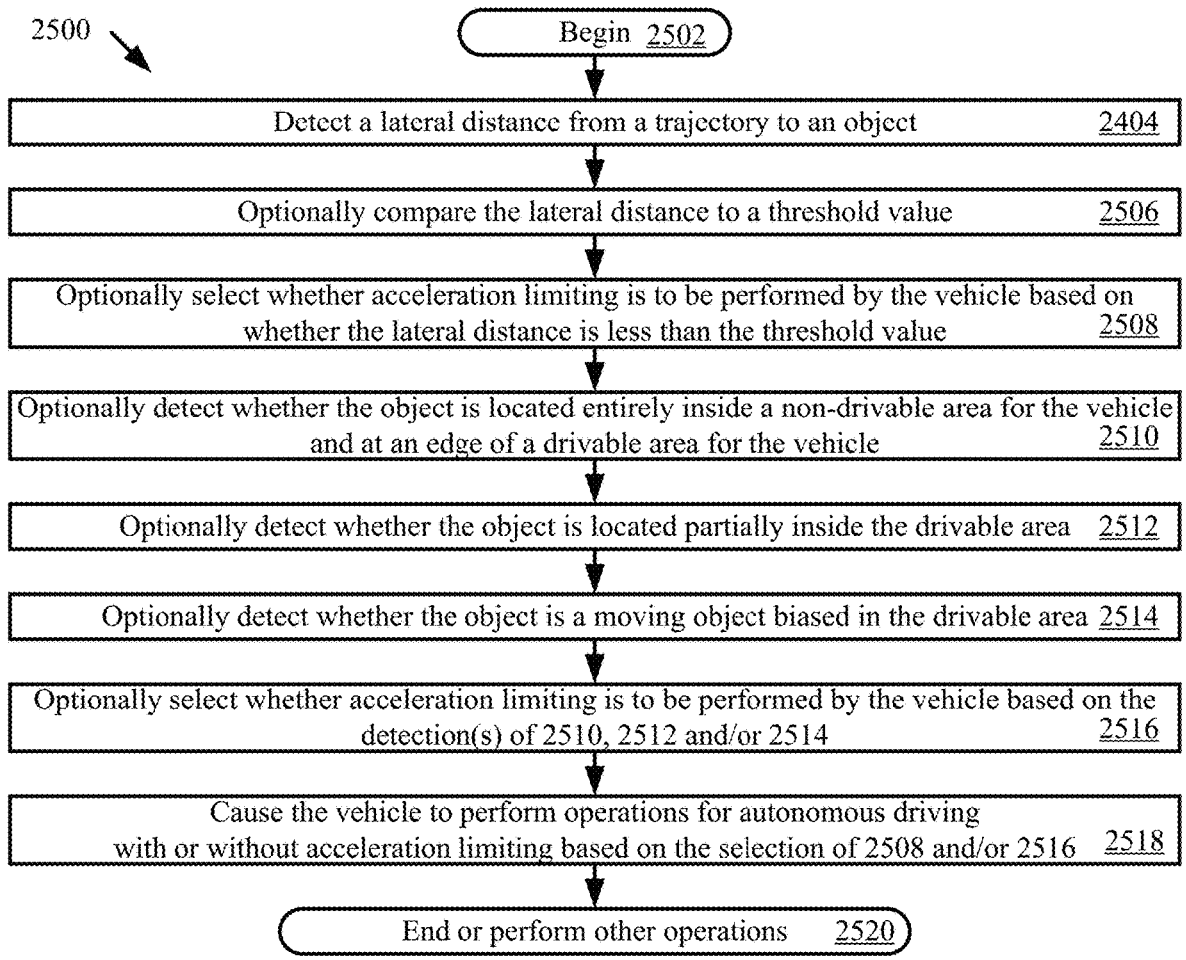
FIG. 25 provides a flow diagram of another method for controlling acceleration of a vehicle.

Referring now to FIG. 25, there is a flow diagram of another method 2500 for selectively limiting acceleration of a vehicle. Method 2500 can be performed at least partially by an on-board computing device (for example, on-board computing device 122 of FIG. 1 and/or vehicle on-board computing device 220 of FIG. 2) of the vehicle and/or another computing device (for example, server 110 of FIG. 1 and/or computer system 300 of FIG. 3).

Method 2500 begins with 2502 and continues with 2504 where the computing device processes sensor data to detect a lateral distance from a point on a trajectory of the vehicle to an object the vehicle is expected to pass when following the trajectory. The object is located off of and to a side of the trajectory. The point represents a future location of the vehicle while passing the object. The lateral distance may be detected by, for example: selecting an index point from a plurality of index points of the trajectory that is aligned with a center of the object offset to a side of the trajectory; determining a distance between the selected index point and an edge of the object; and considering the distance as the lateral distance.

In 2506-2508, the computing device may compare the lateral distance to a threshold value and select whether acceleration limiting is to be performed by the vehicle based on results of the comparison. The computing device may cause the vehicle to perform operations in 2518 for autonomous driving with or without acceleration limiting based on its selection. For example, acceleration limiting is selected when the lateral distance is less than the threshold value.

The computing device may additionally or alternatively perform operations to: detect whether the object is located entirely inside a non-drivable area for the vehicle and at an edge of a drivable area for the vehicle; detect whether the object is located partially inside a drivable area for the vehicle; and/or detect whether the object is a moving object biased in a drivable area for vehicle. The computing device may cause the vehicle to perform operations in 2518 for autonomous driving with or without acceleration limiting based on one or more of these detections. For example, the vehicle is caused to perform the operations for autonomous driving without acceleration limiting when (i) the lateral distance is greater than the threshold value, (ii) the object is located entirely inside the non-drivable area but away from the edge of the drivable area, (iii) the object is not at least partially located inside the drivable area for the vehicle, and/or (iv) the object is not a moving object biased in the drivable area for the vehicle. The vehicle is caused to perform the operations in 2518 for autonomous driving with acceleration limiting when (i) the lateral distance is less than the threshold value, (ii) the object is located entirely inside the non-drivable area and at the edge of the drivable area, (iii) the object is located partially inside the drivable area for the vehicle; and/or (iv) the object is a moving object biased in the drivable area for the vehicle. The amount of acceleration can be determined in the same or similar manners as described above. Subsequently, 2520 is performed where method 2500 ends or other operations are performed.

As described above, the present solution concerns implementing systems and methods for controlling acceleration of a vehicle. The methods may comprise performing the following operations by a computing device: detecting a lateral distance from a point on a trajectory of the vehicle to a first object the vehicle is expected to pass when following the trajectory (where the first object is located off of and to a side of the trajectory and the point representing a future location of the vehicle while passing the first object); selecting whether acceleration limiting is to be performed by the vehicle based on the lateral distance; obtaining an amount by which the acceleration of the vehicle is to be limited, when a selection is made that acceleration limiting is to be performed by the vehicle; and causing the vehicle to perform operations for autonomous driving with limiting of acceleration by the obtained amount.

In some scenarios, the amount by which acceleration of the vehicle is to be limited can be obtained by: defining an interval with a first end located a pre-defined distance from the first object and a second opposing end located the pre-defined distance from the first object; obtaining a distance between the first object and each index point of the trajectory within the interval; obtaining a desired acceleration for each said index point of the trajectory based on the respective one of the distances; selecting the smallest value from the desired accelerations for limiting acceleration of the vehicle; and/or adjusting the smallest value based on a class of the object. The desired acceleration may be obtained using a look-up table comprising a plurality of different acceleration values that are indexed by a plurality of different distance values. The smallest value may be adjusted by a first amount when the object is associated with a first class and by a second different amount when the object is associated with a second different class.

In those or other scenarios, the vehicle is expected to additionally pass a second object. Thus, the amount by which acceleration of the vehicle is to be limited can be obtained by, for each of the first and second objects: defining an interval with a first end located a pre-defined distance from the first or second object and a second opposing end located the pre-defined distance from the first or second object; obtaining a distance between the first or second object and each index point of the trajectory within the interval; obtaining a desired acceleration for each said index point of the trajectory based on the respective one of the distances; selecting a smallest value from the desired accelerations for the first and second object at each index point of the trajectory; generating resultant acceleration value(s) using the selected smallest values; and/or adjusting the resultant acceleration value(s) based on at least one of a classification of the first object and a classification of the second object.

The resultant acceleration value(s) may be generated by a machine learning algorithm that is trained to generate resultant acceleration values based on context information derived from sensor data. The context information can include, but is not limited to, a relative location of vehicle and the first object, a relative location of the vehicle and the second object, a position of vehicle, a position of first object, a position of the second object, the trajectory, a predicted trajectory for the first object, a predicted trajectory for the second object, a classification of the first object, a classification of the second object, a direction of travel for the vehicle, a direction of travel for the first object, and/or a direction of travel for the second object.

In those or other scenarios, the selection at to whether acceleration limiting is to be performed by the vehicle can be further based on whether the first object is located entirely inside a non-drivable area for the vehicle and at an edge of a drivable area for the vehicle, whether the first object is located partially inside a drivable area for the vehicle, and/or whether the first object is a moving object biased in a drivable area for the vehicle.

As described above, the present solution additionally or alternatively concerns implementing systems and methods for controlling acceleration of a vehicle. The methods may comprise performing the following operations by computing device(s): detecting a lateral distance from a point on a trajectory of the vehicle to a first object the vehicle is expected to pass when following the trajectory (where the first object being located off of and to a side of the trajectory and the point representing a future location of the vehicle while passing the first object); selecting whether acceleration limiting is to be performed by the vehicle based on the lateral distance; obtaining a margin of the vehicle defined by a sequence of points; obtaining an amount by which the acceleration of the vehicle is to be limited based on the trajectory and the margin of the vehicle, when a selection is made that acceleration limiting is to be performed by the vehicle; and causing the vehicle to perform operations for autonomous driving with limiting of acceleration by the obtained amount.

The sequence of points may be obtained by: sliding a footprint of the vehicle longitudinally along the trajectory; and for each index point of the trajectory, sliding the footprint laterally until the footprint intersects with the first object, and obtaining a vehicle center or center of gravity specified by the footprint at a laterally slid location intersecting the first object.

In some scenarios, the amount by which the acceleration of the vehicle is to be limited may be obtained by defining an interval with a first end that is located a pre-defined distance from the first object and a second opposing that is located the pre-defined distance from the first object. For each index point of a plurality of index points of the trajectory that are located in the interval, performing the following operations: obtaining a first distance between the margin of the vehicle and each index point of the trajectory within the interval and a second distance between the margin of the vehicle and an edge of drivable area for the vehicle; obtaining a first desired acceleration based on the first distance and a second desired acceleration based on the second distance; and selecting a largest one of the first and second desired accelerations as a final desired acceleration. The smallest value may be selected from the final desired accelerations for limiting acceleration of the vehicle. The first and second desired accelerations may be obtained using look-up tables each comprising a plurality of different acceleration values that are indexed by a plurality of different distance values. The selected smallest value may be adjusted based on a class of the object. The smallest value may be adjusted by a first amount when the object is associated with a first class and by a second different amount when the object is associated with a second different class.

In those or other scenarios, the vehicle is expected to additionally pass a second object. The amount by which the acceleration of the vehicle is to be limited may be obtained by, for each of the first and second objects: defining an interval with a first end that is located a pre-defined distance from the first or second object and a second opposing that is located the pre-defined distance from the first or second object; and for each index point of a plurality of index points of the trajectory that are located in the interval, obtaining a first distance between the margin of the vehicle and each index point of the trajectory within the interval and a second distance between the margin of the vehicle and an edge of drivable area for the vehicle, obtaining a first desired acceleration based on the first distance and a second desired acceleration based on the second distance, and selecting a largest one of the first and second desired accelerations as a final desired acceleration. A smallest value is selected from the final desired accelerations for the first and second objects at each index point of the trajectory that are located in the interval. Resultant acceleration value(s) is(are) generated using the selected smallest values. The resultant acceleration value(s) may be generated by a machine learning algorithm that is trained to generate resultant acceleration values based on context information derived from sensor data. The context information can include, but is not limited to, a relative location of vehicle and the first object, a relative location of the vehicle and the second object, a position of vehicle, a position of first object, a position of the second object, the trajectory, a predicted trajectory for the first object, a predicted trajectory for the second object, a classification of the first object, a classification of the second object, a direction of travel for the vehicle, a direction of travel for the first object, and/or a direction of travel for the second object. The resultant acceleration value(s) may be adjusted based on a classification of the first object and/or a classification of the second object.

The above-described methods improve overall performance of autonomous vehicles. By implementing the above-described methods, the autonomous vehicles are able to pass nearby obstacles more comfortably using moderate acceleration, able to be more relaxed around pedestrian presence, and able to pass objects inside the drivable area without having to limited its positive acceleration.

The implementing systems of the above-described method(s) can comprise: a processor; and a non-transitory computer-readable storage medium comprising programming instructions that are configured to cause the processor to implement a method for operating an automated system. The above-described methods can also be implemented by a computer program product comprising a memory and programming instructions that are configured to cause a processor to perform operations.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method for controlling acceleration of a vehicle, comprising:
   detecting, by a computing device, a lateral distance from a point on a trajectory of the vehicle to a first object the vehicle is expected to pass when following the trajectory, the first object being located off of and to a side of the trajectory and the point representing a future location of the vehicle while passing the first object;

selecting, by the computing device, whether acceleration limiting is to be performed by the vehicle based on the lateral distance;

obtaining an amount by which the acceleration of the vehicle is to be limited, when a selection is made that acceleration limiting is to be performed by the vehicle; and causing, by the computing device, the vehicle to perform operations for autonomous driving with limiting of acceleration by the obtained amount.

2. The method according to claim 1, wherein the obtaining comprises:

defining an interval with a first end located a pre-defined distance from the first object and a second opposing end located the pre-defined distance from the first object;

obtaining a distance between the first object and each index point of the trajectory within the interval;

obtaining a desired acceleration for each said index point of the trajectory based on the respective one of the distances; and selecting the smallest value from the desired accelerations for limiting acceleration of the vehicle.

3. The method according to claim 2, wherein the desired acceleration is obtained using a look-up table comprising a plurality of different acceleration values that are indexed by a plurality of different distance values.

4. The method according to claim 2, further comprising adjusting the smallest value based on a class of the object.

5. The method according to claim 4, wherein the smallest value is adjusted by a first amount when the object is associated with a first class and by a second different amount when the object is associated with a second different class.

6. The method according to claim 1, wherein the vehicle is expected to additionally pass a second object and the obtaining further comprises:

for each of the first and second objects,
defining an interval with a first end located a pre-defined distance from the first or second object and a second opposing end located the pre-defined distance from the first or second object;
obtaining a distance between the first or second object and each index point of the trajectory within the interval;
obtaining a desired acceleration for each said index point of the trajectory based on the respective one of the distances;

selecting a smallest value from the desired accelerations for the first and second object at each index point of the trajectory; and generating at least one resultant acceleration value using the selected smallest values.

7. The method according to claim 6, wherein the at least one resultant acceleration value is generated by a machine learning algorithm that is trained to generate resultant acceleration values based on context information derived from sensor data.

8. The method according to claim 7, wherein the context information comprises at least one of a relative location of vehicle and the first object, a relative location of the vehicle and the second object, a position of vehicle, a position of first object, a position of the second object, the trajectory, a predicted trajectory for the first object, a predicted trajectory for the second object, a classification of the first object, a classification of the second object, a direction of travel for the vehicle, a direction of travel for the first object and a direction of travel for the second object.

9. The method according to claim 6, further comprising adjusting the at least one resultant acceleration value based on at least one of a classification of the first object and a classification of the second object.

10. The method according to claim 1, wherein the selecting is further based on whether the first object is located entirely inside a non-drivable area for the vehicle and at an edge of a drivable area for the vehicle, whether the first object is located partially inside a drivable area for the vehicle, or whether the first object is a moving object biased in a drivable area for the vehicle.

11. A system, comprising:
a processor;
a non-transitory computer-readable storage medium comprising programming instructions that are configured to cause the processor to implement a method for controlling acceleration of a vehicle, wherein the programming instructions comprise instructions to:

detect a lateral distance from a point on a trajectory of the vehicle to a first object the vehicle is expected to pass when following the trajectory, the first object being located off of and to a side of the trajectory and the point representing a future location of the vehicle while passing the first object;

select whether acceleration limiting is to be performed by the vehicle based on the lateral distance;

obtain an amount by which the acceleration of the vehicle is to be limited, when a selection is made that acceleration limiting is to be performed by the vehicle; and cause the vehicle to perform operations for autonomous driving with limiting of acceleration by the obtained amount.

12. The system according to claim 11, wherein the amount by which the acceleration of the vehicle is to be limited is obtained by:

defining an interval with a first end located a pre-defined distance from the first object and a second opposing end located the pre-defined distance from the first object;

obtaining a distance between the first object and each index point of the trajectory within the interval;

obtaining a desired acceleration for each said index point of the trajectory based on the respective one of the distances; and selecting the smallest value from the desired accelerations for limiting acceleration of the vehicle.

13. The system according to claim 12, wherein the desired acceleration is obtained using a look-up table comprising a plurality of different acceleration values that are indexed by a plurality of different distance values.

14. The system according to claim 12, wherein the programming instructions further comprise instructions to adjust the smallest value based on a class of the object.

15. The system according to claim 14, wherein the smallest value is adjusted by a first amount when the object is associated with a first class and by a second different amount when the object is associated with a second different class.

16. The system according to claim 11, wherein the vehicle is expected to additionally pass a second object and the amount by which the acceleration of the vehicle is to be limited is obtained by:

for each of the first and second objects,
defining an interval with a first end located a pre-defined distance from the first or second object and a second opposing end located the pre-defined distance from the first or second object;

obtaining a distance between the first or second object and each index point of the trajectory within the interval;

obtaining a desired acceleration for each said index point of the trajectory based on the respective one of the distances;

selecting a smallest value from the desired accelerations for the first and second object at each index point of the trajectory; and generating at least one resultant acceleration value using the selected smallest values.

17. The system according to claim 16, wherein the at least one resultant acceleration value is generated by a machine learning algorithm that is trained to generate resultant acceleration values based on context information derived from sensor data.

18. The system according to claim 17, wherein the context information comprises at least one of a relative location of vehicle and the first object, a relative location of the vehicle and the second object, a position of vehicle, a position of first object, a position of the second object, the trajectory, a predicted trajectory for the first object, a predicted trajectory for the second object, a classification of the first object, a classification of the second object, a direction of travel for the vehicle, a direction of travel for the first object and a direction of travel for the second object.

19. The system according to claim 16, wherein the programming instructions further comprise instructions to adjust the at least one resultant acceleration value based on at least one of a classification of the first object and a classification of the second object.

20. A non-transitory computer-readable medium that stores instructions that is configured to, when executed by at least one computing device, cause the at least one computing device to perform operations comprising:

detecting a lateral distance from a point on a trajectory of the vehicle to a first object the vehicle is expected to pass when following the trajectory, the first object being located off of and to a side of the trajectory and the point representing a future location of the vehicle while passing the first object;

selecting whether acceleration limiting is to be performed by the vehicle based on the lateral distance;

obtaining an amount by which the acceleration of the vehicle is to be limited, when a selection is made that acceleration limiting is to be performed by the vehicle; and causing the vehicle to perform operations for autonomous driving with limiting of acceleration by the obtained amount.

* * * * *